(12) United States Patent
Nister et al.

(10) Patent No.: US 12,668,276 B2
(45) Date of Patent: Jun. 30, 2026

(54) YIELD SCENARIO ENCODING FOR AUTONOMOUS SYSTEMS

(71) Applicant: NVIDIA Corporation, Santa Clara, CA (US)

(72) Inventors: David Nister, Bellevue, WA (US); Minwoo Park, Saratoga, CA (US); Miguel Sainz Serra, Palo Alto, CA (US); Vaibhav Thukral, Bellevue, WA (US); Berta Rodriguez Hervas, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 294 days.

(21) Appl. No.: 17/512,495

(22) Filed: Oct. 27, 2021

(65) Prior Publication Data

US 2023/0130814 A1 Apr. 27, 2023

(51) Int. Cl.
| | |
|---|---|
| *B60W 60/00* | (2020.01) |
| *G06N 3/02* | (2006.01) |
| *G08G 1/01* | (2006.01) |

(52) U.S. Cl.
CPC .......... *B60W 60/0015* (2020.02); *G06N 3/02* (2013.01); *G08G 1/0133* (2013.01); *G08G 1/0145* (2013.01)

(58) Field of Classification Search
CPC ... B60W 60/0015; G06N 3/02; G08G 1/0133; G08G 1/0145; G08G 1/0112
See application file for complete search history.

(56) References Cited

U.S. PATENT DOCUMENTS

| | | | | |
|---|---|---|---|---|
| 9,645,577 B1 * | 5/2017 | Frazzoli | ............... | G05D 1/0212 |
| 10,019,011 B1 * | 7/2018 | Green | ............... | B60W 60/0027 |

(Continued)

FOREIGN PATENT DOCUMENTS

| | | |
|---|---|---|
| CN | 108062863 A | 5/2018 |
| CN | 110271556 A | 9/2019 |

(Continued)

OTHER PUBLICATIONS

FOLDOC., "CPU"; 2009. (Year: 2009).*

(Continued)

*Primary Examiner* — Stephanie T Su
(74) *Attorney, Agent, or Firm* — Iron Summit IP LLP

(57) ABSTRACT

In examples, autonomous vehicles are enabled to negotiate yield scenarios in a safe and predictable manner. In response to detecting a yield scenario, a wait element data structure is generated that encodes geometries of an ego path, a contender path that includes at least one contention point with the ego path, as well as a state of contention associated with the at least on contention point. Geometry of yield scenario context may also be encoded, such as inside ground of an intersection, entry or exit lines, etc. The wait element data structure is passed to a yield planner of the autonomous vehicle. The yield planner determines a yielding behavior for the autonomous vehicle based at least on the wait element data structure. A control system of the autonomous vehicle may operate the autonomous vehicle in accordance with the yield behavior, such that the autonomous vehicle safely negotiates the yield scenario.

20 Claims, 12 Drawing Sheets

(56) References Cited

U.S. PATENT DOCUMENTS

| | | | | |
|---|---|---|---|---|
| 10,810,880 | B1 * | 10/2020 | Schweitzer | G08G 1/0133 |
| 10,885,698 | B2 | 1/2021 | Muthler et al. | |
| 2016/0160170 | A1 * | 6/2016 | Matsubara | G06V 20/695 |
| | | | | 435/287.1 |
| 2019/0384304 | A1 * | 12/2019 | Towal | G06N 3/08 |
| 2020/0160076 | A1 * | 5/2020 | Suzuki | G06V 20/56 |
| 2021/0201145 | A1 | 7/2021 | Pham et al. | |
| 2021/0245775 | A1 | 8/2021 | Subramanian et al. | |
| 2021/0304608 | A1 * | 9/2021 | Clark | B60W 30/18154 |
| 2022/0048535 | A1 * | 2/2022 | Niendorf | B60W 60/0011 |
| 2022/0105959 | A1 * | 4/2022 | Hartnett | B60W 50/0097 |
| 2022/0126864 | A1 * | 4/2022 | Moustafa | G08G 1/096758 |
| 2022/0187837 | A1 * | 6/2022 | Tebbens | G05D 1/0221 |

FOREIGN PATENT DOCUMENTS

| | | |
|---|---|---|
| CN | 112581790 A | 3/2021 |
| CN | 113056749 A | 6/2021 |
| JP | 2011123613 A | 6/2011 |
| JP | 2017182297 A | 10/2017 |
| JP | 2020516971 A | 6/2020 |
| JP | 2020139774 A | 9/2020 |

OTHER PUBLICATIONS

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/ Programmable Electronic Safety-related Systems," Retrieved from Internet URL: https://en.wikipedia.org/wiki/IEC_61508, accessed on Apr. 1, 2022, 7 pages.

Nister, David, First Office Action for Chinese Patent Application No. 202210592215.1, filed May 27, 2022, mailed Feb. 26, 2025, 7 pgs.

Nister, David; Notice of Registration for Chinese Patent Application No. 202210592215.1, filed May 27, 2022, mailed Jun. 24, 2025, 5 pgs.

Nister, David; First Office Action for Japanese Patent Application No. 2021-187697, filed Nov. 18, 2021, mailed Jul. 25, 2025, 11 pgs.  English Translation Included .

* cited by examiner

Figure 2:
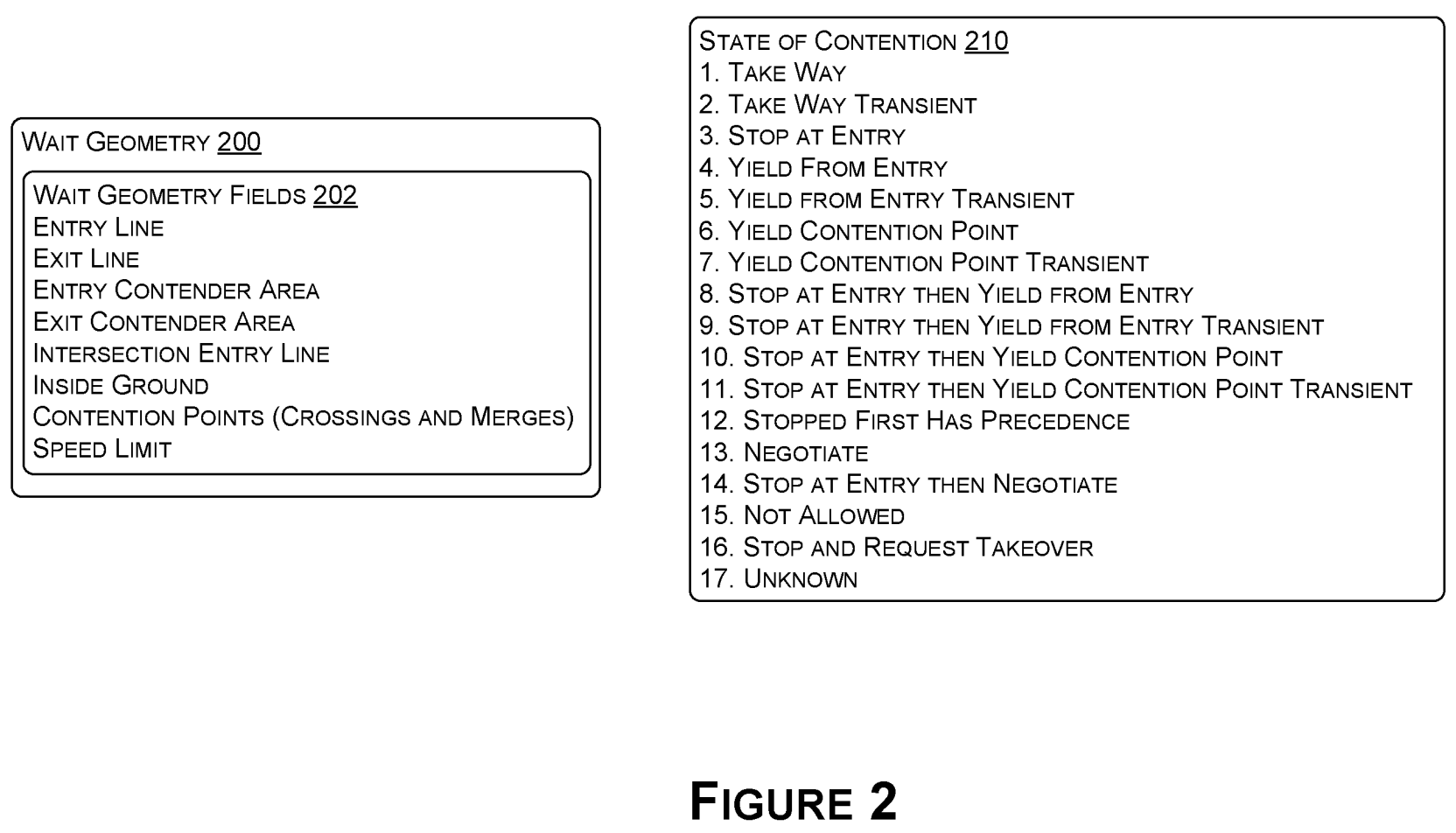

STATE OF CONTENTION 210

1. TAKE WAY
2. TAKE WAY TRANSIENT
3. STOP AT ENTRY
4. YIELD FROM ENTRY
5. YIELD FROM ENTRY TRANSIENT
6. YIELD CONTENTION POINT
7. YIELD CONTENTION POINT TRANSIENT
8. STOP AT ENTRY THEN YIELD FROM ENTRY
9. STOP AT ENTRY THEN YIELD FROM ENTRY TRANSIENT
10. STOP AT ENTRY THEN YIELD CONTENTION POINT
11. STOP AT ENTRY THEN YIELD CONTENTION POINT TRANSIENT
12. STOPPED FIRST HAS PRECEDENCE
13. NEGOTIATE
14. STOP AT ENTRY THEN NEGOTIATE
15. NOT ALLOWED
16. STOP AND REQUEST TAKEOVER
17. UNKNOWN

WAIT GEOMETRY 200

WAIT GEOMETRY FIELDS 202

ENTRY LINE
EXIT LINE
ENTRY CONTENDER AREA
EXIT CONTENDER AREA
INTERSECTION ENTRY LINE
INSIDE GROUND
CONTENTION POINTS (CROSSINGS AND MERGES)
SPEED LIMIT

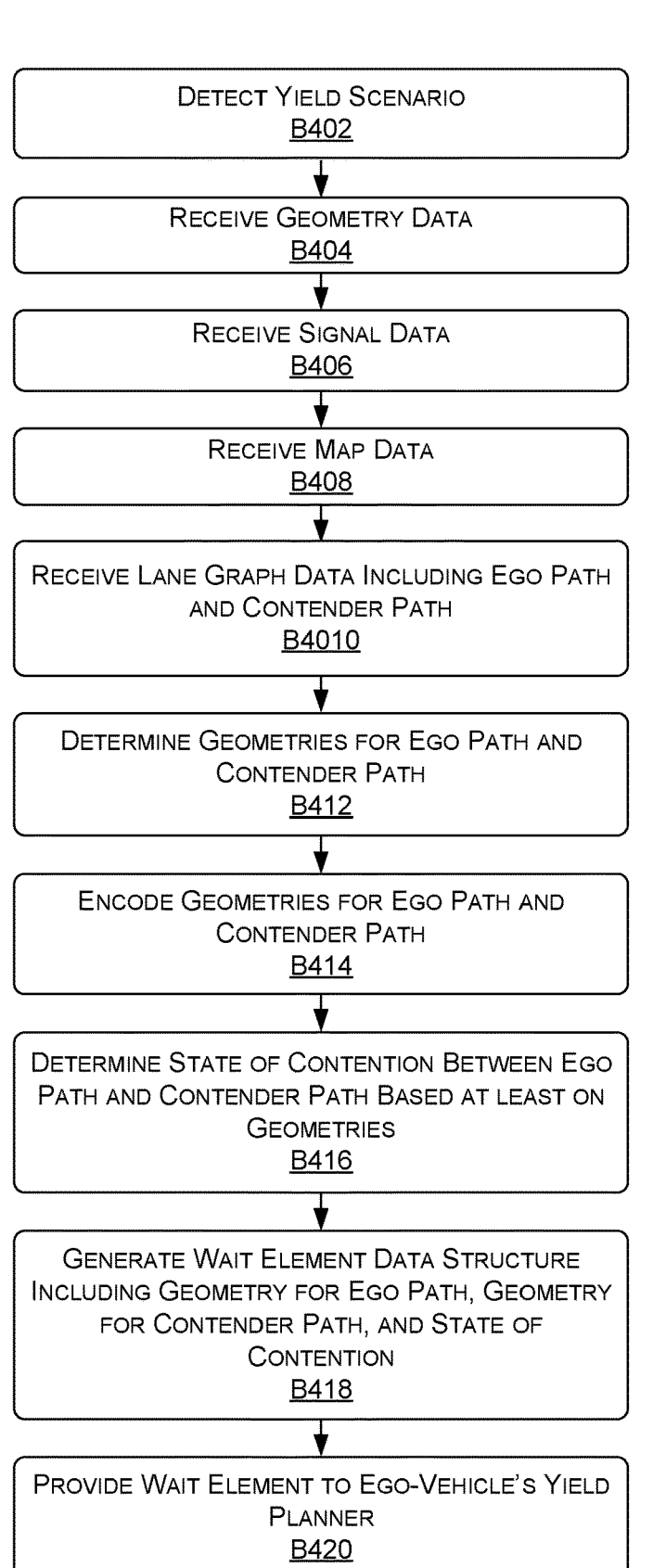

DETECT YIELD SCENARIO
B402

RECEIVE GEOMETRY DATA
B404

RECEIVE SIGNAL DATA
B406

RECEIVE MAP DATA
B408

RECEIVE LANE GRAPH DATA INCLUDING EGO PATH
AND CONTENDER PATH
B4010

DETERMINE GEOMETRIES FOR EGO PATH AND
CONTENDER PATH
B412

ENCODE GEOMETRIES FOR EGO PATH AND
CONTENDER PATH
B414

DETERMINE STATE OF CONTENTION BETWEEN EGO
PATH AND CONTENDER PATH BASED AT LEAST ON
GEOMETRIES
B416

GENERATE WAIT ELEMENT DATA STRUCTURE
INCLUDING GEOMETRY FOR EGO PATH, GEOMETRY
FOR CONTENDER PATH, AND STATE OF
CONTENTION
B418

PROVIDE WAIT ELEMENT TO EGO-VEHICLE'S YIELD
PLANNER
B420

PERCEIVE WAIT GEOMETRY FOR EGO
PATH & CONTENDER PATH
B502

PERCEIVE SIGNALS FOR EGO PATH &
CONTENDER PATH
B504

FUSE WAIT GEOMETRIES WITH MAP
B506

CLASSIFY FUSED WAIT GEOMETRIES
B508

ASSOCIATE FUSED WAIT GEOMETRIES
B510

FUSE SIGNALS WITH MAP
B512

ESTIMATE STATE OF FUSED SIGNALS
B514

RESOLVE STATE OF CONTENTION
B516

GENERATE WAIT ELEMENT
B518

PROVIDE WAIT ELEMENT
B520

600

CHECK CONDITION
B602

PARSE BASE RULES
B604

MATCH MAP RULES
B606

FUSE WAIT ELEMENTS
B608

PACKAGE GEOMETRIES AND STATE OF
CONTENTION IN WAIT ELEMENT
B610

800

MEMORY
804

CPU(s)
806

GPU(s)
808

COMM. INTERFACE
810

I/O PORT(S)
812

I/O COMPONENTS
814

POWER SUPPLY
816

PRESENTATION
COMPONENT(S)
818

LOGIC UNIT(S)
820

802

900

YIELD SCENARIO ENCODING FOR AUTONOMOUS SYSTEMS

CROSS-REFERENCE TO RELATED APPLICATIONS

The present application is related to U.S. patent application Ser. No. 17/395,318 titled "Behavior Planning for Autonomous Vehicles in Yield Scenarios," filed on Aug. 5, 2021, which is hereby incorporated by reference in its entirety.

BACKGROUND

Advances in machine-vision methods, neural network architectures, and computational substrates are beginning to enable autonomous vehicles—such as but not limited to land-based autonomous vehicles (e.g., self-driving cars and trucks) and robots. For the public and governmental regulatory agencies to accept a wide deployment of self-driving cars and trucks on roadways, the self-driving cars and trucks must achieve a safety-level that surpasses the current safety-level of an average human driver. Safe and effective driving requires all drivers to have confidence that other vehicles in the area will appropriately yield when obligated. If a vehicle fails to yield, drivers of other nearby vehicles may be unable to proceed in a safe and efficient manner due to the "unpredictability" of other drivers, e.g., drivers that have provided a behavioral cue that they may fail to yield when obligated. Thus, a necessary condition for the deployment of self-driving cars and trucks includes that the self-driving cars and trucks are successful at "safely and courteously" negotiating yield scenarios (e.g., intersections and merging lanes).

Typically, the local traffic regulations and driving protocols of the area dictate which vehicle operators (and under what conditions) have a responsibility or obligation to yield to others. Such regulations include traffic laws (e.g., vehicles must yield to pedestrians at a crosswalk), signage specific to the situation (e.g., a street sign that indicates which in-roads to an intersection have a responsibility to yield to other in-roads), and other real-time cues (e.g., a near-simultaneous arrival of multiple cars at a traffic circle). However, conventional autonomous vehicles are incapable of encoding and deploying such protocols. Instead conventional systems may aim to avoid collisions while failing to account for yielding protocols, and therefore cannot safely and predictably navigate yield scenarios.

SUMMARY

Embodiments of the present disclosure relate to encoding yield scenarios for autonomous systems (e.g., a manned or unmanned vehicle or robot). Systems and methods are disclosed that provide for the real-time control of autonomous systems when the systems encounter a yield scenario.

In contrast to conventional systems, such as those described above, disclosed embodiments enable autonomous systems to negotiate yield scenarios in a safe and predictable manner. In at least one embodiment, in response to detecting a yield scenario, a data structure is generated that encodes geometries of an ego path, a contender path that includes at least one contention point with the ego path, as well as a state of contention associated with the at least on contention point. Geometry of the yield scenario context may also be encoded, such as geometry defining an inside ground area of an intersection (e.g., as a polygon), entry or exit lines, etc. The data structure is passed to a yield planner of the autonomous system. The yield planner determines a yielding behavior for the autonomous system based at least on the data structure. A control system of the autonomous system may operate the autonomous system in accordance with the yield behavior, such that the autonomous system safely negotiates the yield scenario.

In at least one embodiment, a yield scenario (e.g., a crossing or a merging yield scenario) may be detected based at least on analyzing sensor data generated by at least one sensor of an autonomous vehicle. Map localization and/or perception may be used to determine various information associated with the yield scenario. For example, a first path for the autonomous vehicle and a second path for a contender (e.g., another vehicle or other object) through the yield scenario may be determined. At least one contention point may exist between the paths, which may indicate that a collision is possible were the paths to be traversed. In order to determine a state of contention (defining how the vehicle should behave) of the at least one contention point, the system may determine one or more of the traffic rules that apply to the yield scenario. The wait element data structure (also referred to as a wait element) may then encode information used by the vehicle to navigate the yield scenario, such as geometry of the paths, the state of contention, and other information. For example, the wait element may be provided to a control agent of the vehicle. The control agent may be enabled to employ the wait element to determine a yielding behavior for the first vehicle.

BRIEF DESCRIPTION OF THE DRAWINGS

The present systems and methods for yield scenario encoding for autonomous systems are described in detail below with reference to the attached drawing figures, wherein:

FIG. 2 shows a non-limiting example of a wait element data structure and a non-limiting example of a state of contention data structure, in accordance with some embodiments of the present disclosure;

FIG. 4 is a flow diagram showing a method for encoding yield scenarios for autonomous vehicles (e.g., an ego vehicle), in accordance with some embodiments of the present disclosure;

DETAILED DESCRIPTION

Figure 1:
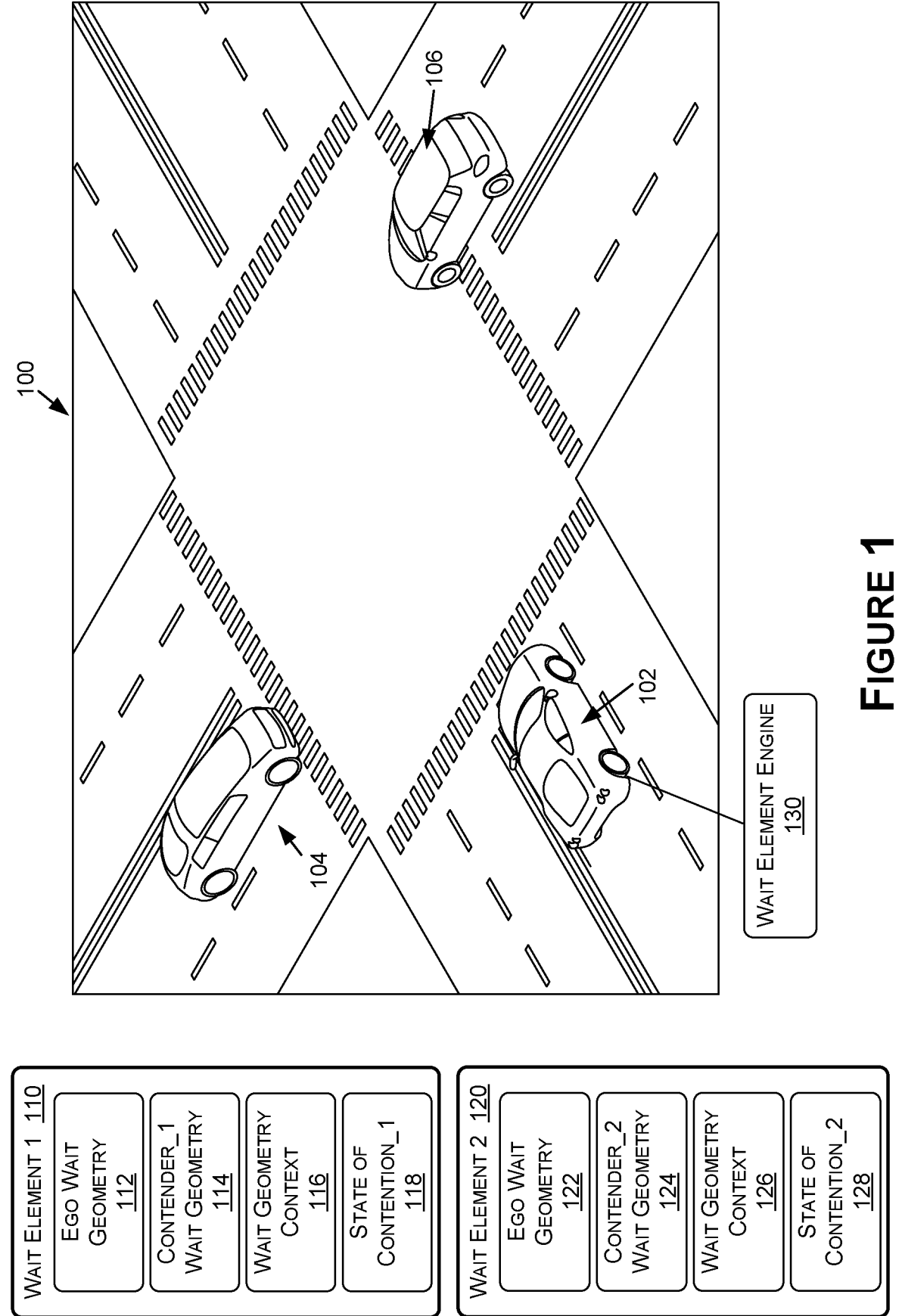
FIG. 1 is an example of a yield scenario, in accordance with some embodiments of the present disclosure, in accordance with some embodiments of the present disclosure.

Systems and methods are disclosed related to encoding yield scenarios for autonomous vehicles. Although the present disclosure may be described with respect to an example autonomous vehicle 700 (alternatively referred to herein as the "vehicle 700" or the "ego-vehicle 700," an example of which is described with respect to FIGS. 7A-7D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to controlling an autonomous vehicle for negotiating a yield scenario, this is not intended to be limiting, and the systems and methods described herein may be used in augmented reality, virtual reality, mixed reality, robotics, security and surveillance, autonomous or semi-autonomous machine applications, and/or any other technology spaces where autonomous control systems may be used.

In the normal course of operating an autonomous vehicle, a control agent must avoid both moving and non-moving obstacles (e.g., other vehicles, pedestrians, bicyclists, lane barriers, and the like). In addition to avoiding collisions, an agent has a fundamental responsibility to yield to other roadway users in certain scenarios (e.g., "yielding conditions"). Such yielding conditions may exist at (controlled and un-controlled) intersections, crosswalks, merging lanes, highway (or interstate) on/off ramps, traffic circles, and the like such as navigating parking structures and/or lots. In order to allow another user to safely, confidently, and efficiently "clear" the yielding condition, yielding behavior may involve deaccelerating, or even bringing the vehicle to a complete stop. For instance, in an unmarked intersection where another car has previously arrived, a subsequent arriving car may deploy appropriate yielding behavior by slowing down to enable the first car to safely clear the intersection. Such yielding behavior ensures that the subsequent car does not enter the intersection until the first car has safely cleared the intersection. Under such yield conditions, one or more users may have a clearly defined obligation (or responsibility) to yield to other users.

Yielding behavior provides utility beyond just avoiding collisions. Proper yielding behavior may insure "courteous and expected" driving dynamics, which are required for safe and efficient transportation. For example, even if an agent acts to avoid a potential collision under a yield condition (e.g., by accelerating through an intersection), failing to yield when there is an obligation to do so creates tense and anxious driving conditions for all users in the area. Even if one accelerates to avoid a collision, an unyielding vehicle may generate anxiety, a feeling of danger, and anger (e.g., road rage) in other drivers, bicyclists, and pedestrians. That is, even if a collision is avoided by taking aggressive action, the collision was not avoided in a "safe and courteous manner," as expected by other users. Accordingly, in operating an autonomous vehicle, an agent for the autonomous vehicle may be obligated (e.g., either legally or normatively) to adopt one or more behavioral yield strategies when approaching a yield scenario.

The disclosure provides, in part, for a "wait element engine" of an autonomous vehicle ("ego-vehicle") that may actively monitor for the arrival of one or more yield scenarios (e.g., the vehicle is arriving at an intersection, the vehicle is negotiating an on/off ramp, or the vehicle is preparing to change lanes). The wait element engine may generate one or more "wait element" data structures that encode a representation of the yield scenario. The wait elements may be provided as input to a "yield planner" for the ego-vehicle. Examples of yield scenarios include crossings (e.g., intersections) and merges (e.g., lane merging on on/on-ramps). Each yield scenario may be associated with at least two actors: the ego-vehicle and at least one contender (e.g., another vehicle, pedestrian, bicyclist, and the like). A contender may include another vehicle (e.g., autonomous, semi-autonomous, and/or conventional manually operated), as well as individuals (pedestrians and bicyclists).

In various embodiments, a yield scenario may be associated with more than one contender (e.g., the ego-vehicle approaching an intersection with multiple other vehicles, pedestrians, and/or bicyclists at an intersection, the ego-vehicle merging into a lane with multiple other vehicles, and the like). Each actor associated with a yield scenario may be associated with one or more "potential paths" or lanes. For an actor of a yield scenario, potential paths or lanes may include the set of current or possible spatial paths given, for example, the actor's current coordinates in a spatial-velocity phase-space. Thus, an actor's potential path may be dependent upon not only their current spatial and velocity coordinates, but also the vehicle's (or individual's or entity's) limitations on accelerating, de-accelerating (e.g., braking power), and maneuverability (e.g., turn radius, traction control, and the like).

When a yield condition is detected, the wait element engine may receive and/or generate environmental data originating from various sources (e.g., on-board and/or off-board sensors and/or detectors, perception-based data, map-based data, geo-location data, and the like) related to the yield scenario. The wait element engine may analyze and fuse the various data, as well as check, parse, and match the data to various yielding-related traffic rules in view of the fused and analyzed data to generate various "wait geometries" and "states of contention" that may characterize the yield scenario for the ego-vehicle. For example, data encoding the potential paths of the vehicles and various aspects of the geometry of the scenario may be parsed and matched against one or more yield or traffic rules to determine a state of contention of the yield scenario (e.g., take way, stop at entry, yield from entry, and the like). The wait geometries may be grouped into one or more "wait groups," where a wait group may refer to all of the wait elements for a yield scenario. The wait geometries and the states of contentions may be encoded in a "wait element" data structure. The wait element data structure(s) may be provided to a "yield planner" of the autonomous vehicle for use in controlling the vehicle.

The yield planner may receive the wait element data structures and determine appropriate yielding behavior. When a control agent for the ego-vehicle adopts the determined yield behavior (e.g., defined by a state of contention), the ego-vehicle may safely satisfy its required and expected yielding obligations, while avoiding collisions.

In at least one embodiment, a wait element engine may receive and/or acquire various input data, which may include geometry-related data, signal-related data, and map-related data. Acquiring (or receiving) data may be accomplished using sensing, perceiving, and/or detecting techniques which may leverage geometry or visual perception, map perception (which may include localization), and signal perception. In at least one embodiment, perception data may include lane graph data. Lane graph data may include one or more paths which may be assigned as potential paths of the ego-vehicle (e.g., ego-paths) and one or more paths which may be assigned as potential paths of one or more contenders (e.g., contender paths). Other input data may include various raw sensor data from the ego-vehicle or the contenders. Geometry input data may include various information about the geometry of the environment, as applied to the potential paths associated with the yield scenario and/or background context. Signal input data may include and/or encode traffic signals such as traffic lights, traffic signs, stop signs, yield signs, right of way signs such as main road signs, speed signs, as well as hand signs or other body poses used to signal traffic.

In various embodiments, a wait element data structure may be generated for each possible pairing of an ego-vehicle potential path and a contender potential path. In non-limiting examples of yield scenarios, a yield scenario is associated with one ego-vehicle and j contenders, where j is a positive integer. The ego-vehicle may be associated with i potential paths and each of the j contenders is associated with k potential paths, where i and k are also positive integers. In such an example, the wait element engine may generate i×j×k separate wait elements. Therefore, each wait element may be associated with one ego-vehicle potential path and one contender potential path. The wait element may encode a "wait geometry" for the ego path, a wait geometry for the contender path, and a wait geometry for a context of the two paths. A wait element may further encode a "state of contention" between the two paths.

Briefly here, a wait geometry for a claimed path (e.g., an ego-path or a contender path) may include a set of field-value pairs or other data types or elements for the path encoding various aspects of the claimed path. Such fields for a wait geometry of a path may include but are not limited to entry lines, exit lines, entry and exit contender areas, intersection entry line and inside ground, contention points between an ego path and a contender path (optional explicit encoding of one of the crossing or merge points between paths), and the like. The contention state (e.g., the state of contention) of a wait element may be or define an instruction(s) to the yield planner about in which manner the ego-vehicle should yield or take way with respect to this wait element. Such states include but are not limited to: take way, stop at entry, yield from entry, and the like.

In at least one embodiment, to generate a wait element, geometry input data, which may be referred to as wait geometry input data, may be "fused" with the lane graph data and the map data. The "fused geometry" data may then be classified (e.g., as a left turn, a right turn, a U-turn, etc.) and associated with one or more paths. The signal data may be fused with the map data. A signal state (e.g., green light, red line, inactive, etc.) may be determined from the fused signal data. The fused, classified, and associated geometry data, along with the map data, the signal state, and the other data may be fed as input to a "contention state resolver" of the wait element engine. The condition state resolver may employ the geometry, signal, map, and other sensor data, along with traffic rules to determine a state of contention and resolve the data into a wait element.

With reference to FIG. 1, FIG. 1 shows an example of a yield scenario 100, in accordance with some embodiments of the present disclosure. The non-limiting yield scenario 100 of FIG. 1 is an example of a crossing (or intersection) yield scenario. Other types of yield scenarios include at least merging yield scenarios (e.g., at a freeway entrance). In this non-limiting example of a crossing yield scenario 100, three vehicles are approaching a 4-way intersection. The three vehicles include a first vehicle 102 (e.g., an ego-vehicle), a second vehicle 104 (e.g., a first contender), and a third vehicle 106 (e.g., a second contender). A wait element engine 130 is employed to generate one or more wait element data structures (e.g., a wait element_1 110 and a wait element_2 120) for the yield scenario 100. In some embodiments, the wait element engine 130 may be on-board the ego-vehicle 102. In other embodiments, the wait element engine 130 may be at least partially remote from the ego-vehicle 102. In such embodiments, the ego-vehicle 102 may access the wait element engine 130 via one or more communication networks.

Figure 3:
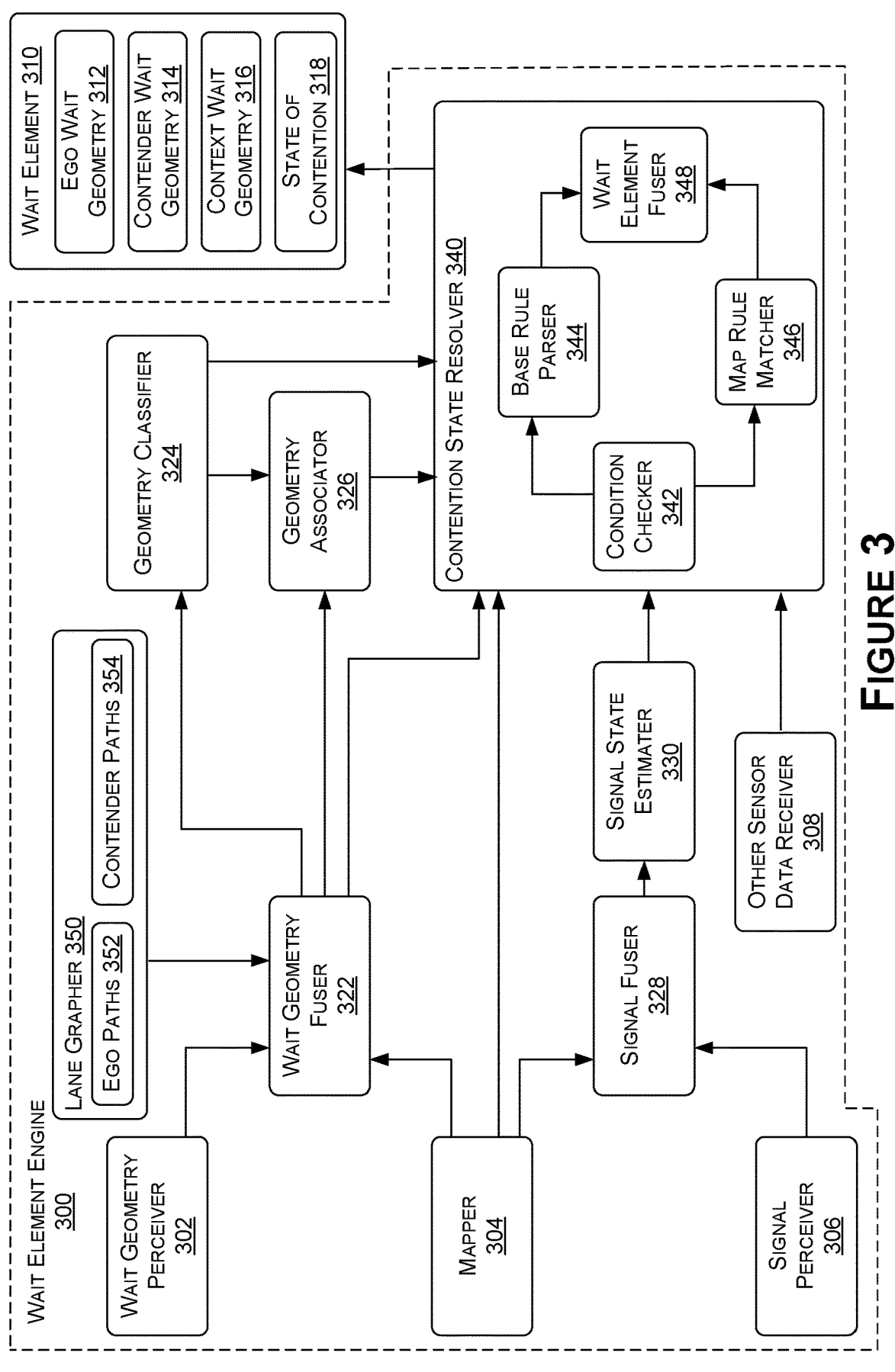
FIG. 3 shows a non-limiting example of a wait element engine, in accordance with various embodiments, in accordance with some embodiments of the present disclosure.

Various embodiments of wait element engines are discussed at least in conjunction with the wait element engine 300 of FIG. 3. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Wait element data structures, such as but not limited to the wait element_1 110 and the wait element_2 120 may be associated with a pair of claimed paths, where one of the claimed paths is a claimed path of the ego-vehicle 102 and another of the paired claimed paths is a claimed path for a contender (e.g., a first contender 104 or a second contender 106). Each wait element may encode a wait geometry for the ego-vehicle's 102 claimed path (e.g., an ego wait geometry 112 of the wait element_1 110 or an ego wait geometry 122 of the wait element_2 120) and a wait geometry for the contender's claimed path (e.g., a contender_1 wait geometry 114 of the wait element_1 110 or a contender_1 wait geometry 124 of wait element 120). Accordingly, a wait geometry_1 110 may be associated with a single claimed path of the ego-vehicle 102 and a single claimed path for the first contender 104 (in other examples more paths may be associated with a wait element). Likewise, a wait geometry_2 120 is associated with a single claimed path of the ego-vehicle 102 and a single claimed path for the second contender 106. Note that the claimed path of the ego-vehicle 102 associated with the wait element_1 110 may be (but need not be) the same ego-vehicle 102 claimed path associated with the wait element_2 120. Various embodiments of wait element geometries are discussed in conjunction with at least FIG. 2.

In addition to wait geometries for a pair of claimed paths, each wait element may encode a wait geometry for a context (e.g., a wait geometry context 116 of the wait element_1 110 and a wait geometry context 126 of the wait element_2 120). Furthermore, each wait element may encode a state of contention for the paired claimed paths (e.g., the state of contention_1 118 of the wait element_1 110 and a state of contention_2 of the wait element_2 120). Various embodiments of wait geometry contexts and states of contention are discussed at least in conjunction with FIG. 2.

More generally, a wait element may include (or encodes) some subset of the wait geometry of one ego path (e.g., a claimed path of the ego-vehicle) and the wait geometry of one contender path (e.g., a claimed path for a contender of the yield scenario 100), a wait geometry context, and a state of contention. An ego wait geometry 112, the contender_1 wait geometry 114, the wait geometry context 116, and a state of contention_1 118 (of the wait element_1 110) may be data objects and/or data structures. Likewise, the ego wait geometry 122, a contender_2 wait geometry 124, a wait geometry context 126, and a state of contention_2 128 (of the wait element_2 120) may be data objects and/or data structures. In various embodiments, if data values (or elements) of one or more of these data objects are not readily available (or not applicable to a given yield scenario), the data encodings for these missing elements may be set to "invalid" and/or "not applicable."

In one or more embodiments, wait elements (e.g., the wait element_1 110 and the wait element_2 120) constitute the 'atoms' of how information (or data) may be encoded about wait conditions (e.g., the yield scenario 100). The wait elements may be provided as input to the ego-vehicle's 102 yield planner (not shown in FIG. 1). Based at least on the encodings of the wait elements, the yield planner may determine an appropriate yield behavior to safely negotiate the yield scenario 100. As discussed herein, a wait element may be determined and/or generated by employing at least one of two methodologies (and/or a combination thereof). One methodology includes employing a set of yield-related traffic rules (e.g., yield heuristics) to the yield scenario 100. Another methodology includes employing mapping and the real-time perception of geometry-related and/or signal-state data to the yield scenario 100. As noted, in various embodiments, the two methodologies may be combined in various forms to employ mapping data, the real-time perception of geometrical/signal data, and the yield heuristics.

Turning our attention to FIG. 2, FIG. 2 shows a non-limiting example of a wait element data structure 200 and a non-limiting example of a state of contention data structure 210 (also referred to as a state of contention), in accordance with some embodiments of the present disclosure. In various embodiments, a wait geometry 200 and/or a state of contention 210 may be a data object, or any other such structured data. In general, the wait geometry 200 may represent a geometry and associated metadata that results when additional information (e.g., information and/or data that is related to a yield scenario, e.g., the yield scenario 100 of FIG. 1) is applied to the lane graphs (e.g., an ego-vehicle claimed path and/or a contender claimed path). That is, the wait geometry 200 may apply to an ego path (e.g., a claimed path of the ego vehicle), a contender path (e.g., a claimed path of a contender), or to a background context. For instance, if the wait geometry 200 applies to an ego path, then the wait geometry 200 may be similar to ego wait geometry 112 of the wait element_1 110 and/or ego wait geometry 122 of the wait element_2 120 of FIG. 1. If the wait geometry 200 applies to a contender path, then the wait geometry 200 may be similar to the contender_1 wait geometry 114 of the wait element_1 110 and/or the contender_2 wait geometry 124 of the wait element_2 120. If the wait geometry 200 applies to a background context, then the wait geometry 200 may be similar to wait geometry context 116 of the wait element_1 110 and/or the wait geometry context 126 of the wait element_2 120. Such contextual wait geometries may be related to the boundaries and/or inside ground area of an intersection, or the presence of an intersection entry line.

In various non-limiting embodiments, wait geometry may encode at least some of its data in field-value pairs. Accordingly, a set of fields (e.g., wait geometry fields 202) may be associated with (or encoded within) the wait geometry 200. One or more values may be associated with each field of the wait geometry fields 202 to encode a set of field-value pairs. Note that a value may be a data structure or data. In some embodiments, a value for a particular field may be another field, such that the wait geometry 200 may encode one or more data trees. As shown in FIG. 2, such fields 202 may include, but are not limited to: entry line (e.g., of the corresponding ego path or contender path), exit line (e.g., of the corresponding ego path or contender path), entry contender area (e.g., of the corresponding ego path or contender path), exit contender area (e.g., of the corresponding ego path or contender path), and intersection entry line (e.g., of the corresponding ego path or contender path). In some embodiments, the fields 202 may include coordinates or other information defining boundaries and/or a location of an inside ground area (as part of the general context of a wait group), and one or more contention points between an ego path and a contender path (optional explicit encoding of one of the crossing or merge points between paths). The fields 202 may additionally include a speed limit applied in the general context (which is to be considered to apply between the entry line and exit line). The values for each of these fields can be encoded as invalid to accommodate encoding wait conditions where the fields do not apply to the particular yield scenario (for example an on-ramp traffic light only has an ego path and an entry line, but no exit line, contender path, or inside ground). Another example would be an encoding of a new speed limit by a wait group containing only an entry line and a speed limit in the overall context, and everything else set to invalid. The exit line is then to be interpreted as infinite or until further notice, and similarly for other properties.

Entry lines for an ego path may encode a stopping point for several of the yielding behaviors. Entry lines may also signal the beginning of the general contention area, bookended by the exit line, which may indicate which segment of the ego path needs to be cleared to clear this wait group of wait conditions. An inside ground area may represent the inside ground of an intersection as a polygonal area which may be referenced to a coordinate space. An inside ground area may cover the segment between the entry line and the corresponding exit line (sometimes the exit line may be moved out such as beyond a pedestrian crossing even though the inside ground is not). The entry contender areas and inside ground provides context for analyzing other actors. This may be performed by assigning actors to paths and areas (in a non-mutually exclusive way). The geometry of ego and contender paths as well as the contention point may be employed by the yield planner to implement yield behavior as required. The geometry may also be employed to determine which rules apply.

In some examples, a contention point may indicate or represent an explicit geometric point. In other examples, a contention point may refer to an abstract concept that is the particular contention that a wait element is referring to and/or is encoding the state of. In such examples, the state of contention at a contention point may be the payload of the entire contention state resolution process. It may provide, for each contention point, a determination of a manner in which the ego vehicle should yield or not yield with respect to this contention point. In this sense the contention point may also indicate a choice of ego path, access a contender path and via that contender path, actual contenders and how the ego-vehicle is to behave relative to them.

The wait geometry may be collected (e.g., logically organized) into groups, where the semantic meaning of a wait group may be that all wait conditions in this group may be considered together and in particular cleared together so that the ego-vehicle is not left in between (for example the ego-vehicle should not be stuck waiting for pedestrians at the end of a left turn while the ego-vehicle is still in the path of oncoming traffic, so the oncoming traffic contention may be considered together with the pedestrian crossing contention in the same wait group).

Referring to the state of contention 210, a wait element engine, such as but not limited to the wait element engine 300 of FIG. 3, may include a contention state resolver (e.g., a contention state resolver 340 of the wait element engine 300). Such a contention state resolver may perform a contention state resolution process. The goal of a contention state resolution process may be to provide a contention state (e.g., the state of contention 210) for each of the wait elements (e.g., the wait element_1 110 and the wait element_2 120 of FIG. 1). The contention state 210 of a wait element may be an instruction to the yield planner about in which manner the ego-vehicle should yield or take way with respect to this wait element, as a matter of rule, expectation, formal or informal convention or norm.

In some non-limiting embodiments, the state of contention 210 may not indicate what is actually happening in the yield scenario, what is physically possible in the yield scenario, or whether the ego-vehicle may be forced to yield although it has the right of way in the yield scenario (e.g., a crossing yield scenario or a merging yield scenario). Rather, the state of contention 210 may indicate what should happen according to convention. It may then be the yield planner's responsibility to actually implement yielding, in the sense that may consider what should happen (e.g., as encoded in the state of contention 210), whether the ego-vehicle is actually in a position to stop and follow that instruction, and whether the other actors (e.g., the contenders of the yield scenario) appear to be fulfilling their expected yielding duties, and take appropriate action. For example, the yield planner can determine that even though the contention state is Take Way, a contender is not yielding (essentially detecting 'appropriate-to-honk') and decide to yield although that is not what should have happened. The yield planner may implement yielding behavior that analyzes all contentions in a wait group until all the wait elements in the group can be cleared jointly. All contentions in the wait group may be jointly obeyed, meaning the most restrictive contention may define the ego-vehicle's expected yielding behavior. For example, if one contention state of the wait group is Take Way and another Stop at Entry, the ego-vehicle may remain at the entry line.

As shown in FIG. 2, the state of contention 210 (e.g., as encoded in a wait element) may include one or more of the seventeen states listed in the state of contention 210. Note that this list of possible states of contention is non-exhaustive, and in other embodiments, the state of contention 210 may include additional and/or alternative states of contention. The Take Way state may indicate to expect contenders to yield. Accordingly, the Take Way state may indicate no formal constraint for the corresponding wait element (other than for the yield planner to watch contenders related to this wait element and make sure they yield as expected). For the various contention states, the keyword transient may be employed to indicate that the corresponding contention state may be updated and/or evolve in the near-term future. Thus, a Take Way Transient state may indicate that a take way state currently applies but is likely to change soon to a more restrictive state. The canonical example is the 'yellow' state of a traffic light, which may be encoded by Take Way Transient. A Stop at Entry may indicate a directive is to stop at the entry line, await for further instructions, and to not proceed any further until the state of contention changes. A Yield from Entry state may indicate that until such time that this contention is expected to be cleared, the ego-vehicle should remain at the entry line. For such Stop at Entry states, a pre-stop may not be mandated by rule, but a control agent of the ego-vehicle should make sure that the contention is clear before the ego-vehicle passes the entry line, which often results in a pre-stop. Note also that since the wait conditions in the wait group may be considered jointly, it typically means in practice that the control agent should be sure that all contentions in the wait group are clear before the ego-vehicle passes the entry line. In other words, if one contention in the wait group has Yield from Entry, all the other contentions in the wait group may inherit that same contention state when analyzed by the yield planner, and if one has Stop at Entry, all wait elements in the group may inherit the pre-stop. The Yield From Entry transient state may be the transient version of the Yield from Entry state.

A Yield Contention Point state may indicate that a pre-stop may not be mandated by rule, nor that the ego-vehicle may have to formally remain at the entry line while waiting for the contention to clear (although there is nothing wrong in principle with doing so). The control agent may have to make sure that the ego-vehicle properly yields to contenders related to this contention, that the ego-vehicle does not block the contention, and that the ego-vehicle behaves in such a way that it is clear to contenders related to this contention that the ego-vehicle is yielding. This could mean the ego-vehicle pulls forward for a left turn in an intersection, but slowly enough and with enough margin that oncoming traffic understands that the ego-vehicles appears to intend to yield, and obviously not getting in the way of oncoming traffic. The Yield Contention Point Transient state may be the transient version of the Yield Contention Point state. The Stop at Entry then Yield from Entry state may be equivalent (or at least similar) to the Yield from Entry state, but with the additional condition that a pre-stop is required at the entry line. The Stop at Entry then Yield Contention Point state may be equivalent (or at least similar to) the Yield Contention Point state, but with the additional condition that a pre-stop is required at the entry line.

The Stop at Entry then Yield Contention Point Transient state may be the transient version of Stop at Entry then Yield Contention Point state. The Stopped First has Precedence state may be the canonical 'US multi-way stop' case. The right of way may be determined as a first-in-first-out queue where 'in' is defined as coming close to the intersection (likely in the corresponding contender area at the entry line pointing into the inside ground) as the first actor from that contender path, and stopping. In other words, this state of contention may imply further processing of 'who-stopped-first' to actually resolve into a Take Way or Yield from Entry state per each actor associated with this contender path.

The Negotiate state may indicate that there is no known basis to determine right of way, such as for example for a highway merge where there is no cue from traffic rules, map statistics, geometry or size of the road (equally large highways merging and with similarly straight shapes). The Stop at Entry then Negotiate state may be equivalent (or at least similar to) the Negotiate state but with the additional condition that a pre-stop is required at the entry line. This state may be employed when there is no convention to go by but there is a clear entry line. The Not Allowed state may be employed to enable an encoding that something is not allowed. For example, the wait element could contain a left turn path across traffic into a parking lot, and there could be signals present that indicate that turn is forbidden (such as across a solid double yellow line). In this case, the ego-vehicle may proceed in such a way to signal (to the contenders) not only that the condition is to stop right now, but that it will never change, it is simply not allowed. This state may be useful to the yield planner as it is considering multiple choices of ego path (e.g., multiple ego paths can be considered simultaneously). The Stop and Request Takeover state may indicate the ego-vehicle encountered something that is determined to be outside of the operating design domain (e.g., signals may have been detected that indicate road works or a flagger and the ego-vehicle has not yet implemented handling such a condition). In such states, the control agent (or yield planner) may request a firm slow down, stop and request takeover behavior of the ego-vehicle. The Unknown state may be employed for encoding predictions for future state of contention, in which case it may be useful to be able to encode that there is no knowledge or prediction.

FIG. 3 shows a non-limiting example of the wait element engine 300), in accordance with some embodiments of the present disclosure. As noted throughout, the wait element engine 300 may be on-board an autonomous vehicle (e.g., the ego-vehicle 102 of FIG. 1). In other embodiments, an autonomous vehicle may have access to a remote wait element engine via one or more communication networks. As discussed throughout, when an ego-vehicle approaches a crossing or merging yield scenario (e.g., a crossing yield scenario 100 of FIG. 1), the wait element engine 300 may generate one or more wait elements (e.g., the wait element_1 110 of FIG. 1, the wait element_2 120 of FIG. 1, and a wait element 310 of FIG. 3) as output. Various inputs to the wait element engine 300 are discussed below.

Wait element engine 300 may include a wait geometry perceiver 302, a mapper 304, a signal perceiver 306, a lane grapher 350, and/or another sensor data receiver 308. The wait geometry perceiver 302, the mapper 204, the signal perceiver 306, the lane grapher 250, and the other sensor data receiver 308 receive various inputs as discussed below. The wait element engine 300 may further include a wait geometry fuser 322, a geometry classifier 324, and a geometry associator 326. The wait element engine 300 may also include a signal fuser 328, a signal state estimator 330, and the contention state resolver 340. The contention state resolver 340 may include a condition checker 342, a base rule parser 344, a map rule checker 346, and a wait element fuser 348. The outputted wait element 310 may include an ego wait geometry 312, a contender wait geometry 314, a context wait geometry 316, and a state of contention 318.

The lane grapher 350 is generally responsible for receiving one or more lane graphs as input to the wait element engine 300. The lane graphs may be received in response to approaching and/or detecting a yield scenario. A lane graph may include a set of claimed paths from the same lane bundle, and include a set of ego paths 352 and a set contender paths 354. The ego paths 352 may be received or generated from outputs of one or more neural networks or other machine learning models, a map, and/or vehicle traces. For example, and without limitation, machine learning models described herein may include any type of machine learning model, such as one or more machine learning models using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

The ego paths 352 may be fused in the ensemble into a new lane graph. The lane graphs may be structured in an array of lane graphs, allowing the flexibility to easily employ any combination of lane graphs. One or more of the contender paths 354 may overlap with one or more of the ego paths 352 at one or more contention points. A particular contention point may be classified as one of two primary contention point types: crossing contention points or merging contention points. For crossings contention, an ego path may, by way of example and not limitation, intersect a contender path at a single point (or small neighborhood of points). For merging contention points, an ego path may meet and join a contender path (or vice versa) for at least a segment of the contender path. The contender paths 354 may be received or generated from outputs of one or more neural networks or other machine learning models, a map, or intersection parsing. While the ego paths 352 are claimed paths for the ego-vehicle, the contender paths are claimed paths from vehicles, bicycles, pedestrians, trams and trains, or any other actor in the yield scenario. Like the ego paths 352, the contender paths 354 may be merged from their sources (which may be similar to or the same as the sources of the ego paths 352) to form an ensemble.

The wait geometry perceiver 302 and the signal perceiver 306 may generally perform "wait perception." The wait geometry perceiver 302 receives various geometry-related input (in response to identifying and/or detecting the ego-vehicle approaching a yield scenario) and generates wait geometry for output (e.g., the wait geometry 200 of FIG. 2). Thus, the wait geometry perceiver 302 may generate a wait geometry (e.g., the ego wait geometry 312) for each ego path of the set of the ego paths 352. Likewise, the wait geometry perceiver 302 may generate a wait geometry (e.g., the contender wait geometry 314) for each contender path of the set of contender paths 354. Likewise, the signal perceiver 306 receives various signal-related input (in response to identifying and/or detecting the ego-vehicle approaching a yield scenario) and generates a signal for output.

A wait geometry (e.g., the ego wait geometry 312 or the contender wait geometry 314) may include geometry and metadata that results when additional information about wait conditions is applied to the lane graph. Wait geometry may apply to an ego path (such as an entry line), a contender path (such as a contender area), or to a background context (such as the inside ground of an intersection, or the presence of an intersection entry line). As discussed in conjunction with at least the wait geometry 200 of FIG. 2, a particular wait geometry may include filed-value pairs for: entry lines and exit lines (for both ego paths and contender paths), entry and exit contender areas (for both ego paths and contender paths), intersection entry line and inside ground (as part of the general context of a wait group), contention points between an ego path and a contender path (optional explicit encoding of one of the crossing or merge points between paths). A wait geometry may include a field-value pair for a speed limit applied in the general context (which is to be considered to apply between the entry line and exit line). The value for each of these fields may be encoded as invalid to accommodate encoding wait conditions where the fields do not apply (for example an on-ramp traffic light only has an ego path and an entry line, but no exit line, contender path, or inside ground) to the yield scenario. Another example may be an encoding of a new speed limit by a wait group containing only an entry line and a speed limit in the overall context, and everything else set to invalid. The exit line may then be interpreted as infinite or until further notice, and similarly for other properties.

A value for the entry line field for an ego path may encode the ego-vehicle's claimed path stopping point for multiple possible yielding behaviors. Such entry lines may also encode the beginning of the general contention area, book-ended by the exit line, which may indicate which segment of the ego path needs to be cleared to clear this wait group of wait conditions. The inside ground area may represent the inside ground of an intersection as a polygonal area. The inside ground area may cover the path segment between the entry line and exit line (sometimes the exit line is moved out such as beyond a pedestrian crossing even though the inside ground is not). The entry contender areas and inside ground may provide context for analyzing other actors. This may be enabled by an obstacle in path analysis (OIPA) which assigns actors to paths and areas (in a non-mutually exclusive way). The geometry of ego and contender paths as well as the contention point may be employed by the yield planner to implement yielding as required. The wait geometry may also be employed to determine which rules apply.

A contention point may represent an explicit geometric point(s) (e.g., an intersection of an ego path and a contender path). In some embodiments, a contention point may be considered as an abstract concept that is the particular contention that a wait element is referring to and is encoding the state of. In this latter sense, the state of contention at a contention point may be the payload of the contention state resolution process (as performed by the contention state resolver 340). The state of contention may provide, for each contention point, the determination of 'in which manner should the ego-vehicle yield or not yield with respect to this contention point.' In this sense, the contention point may also indicate, given a choice of ego path, through access to a contender path and via that contender path, actual contenders and how the ego-vehicle should proceed relative to them.

The wait geometry may be grouped into one or more wait groups, where the semantic meaning of a wait group is that all wait conditions in this group may be to be considered jointly and in particular may be cleared jointly so that the ego vehicle is not left in between (for example the ego-vehicle is not stuck waiting for pedestrians at the end of a left turn while the ego-vehicle is still in the path of oncoming traffic, so the oncoming traffic contention needs to be considered together with the pedestrian crossing contention in the same wait group).

The mapper 304 may receive map data in response to identifying and/or detecting the ego-vehicle approaching a yield scenario (e.g., based at least on map localization). The map data may include one or more 2D or 3D maps of the environment of the upcoming yield scenario. The signal perceiver 306 receives signal-related data in response to identifying and/or detecting the ego-vehicle approaching a yield scenario. Signal-related data may include signal data that encodes indications of such things as traffic lights and traffic signs, e.g., stop signs, yield signs, right of way signs such as main road signs, as well as speed signs. Signal data may also encode outputs generated from one or more neural networks or other machine learning models such as whether an intersection is a traffic sign intersection, a stop sign intersection, unmarked, a roundabout, a highway on-ramp, a toll-booth, or some other type. Signal data may encode indications of policemen, flaggers, or road workers directing traffic, bars blocking the way and road lights at a pedestrian crossing. Signal data may encode indications of traffic cones, merge arrows and all temporary items put on the road to re-direct traffic. In various embodiments, the signal perceiver 306 may separate the presence of a signal and its state. The signal perceiver 306 may perform live signal perception which provides both presence and state of a signal (e.g., there is a traffic light at these 2D or 3D coordinates and its current state is yellow). In some embodiments, a map (e.g., a map received by the mapper 304) can include information about the likely presence and/or location of a signal, such as the presence of a traffic light or stop sign, while the state of the signal, such as the state of a traffic light, may be provided by live perception (or infrastructure to vehicle communication), via the signal perceiver 306. Signal detection (via the signal perceiver 306) may provide the presence, type and spatial properties of a signal, such as 3D position and bounding box of a traffic light or sign or policeman detecting traffic.

The wait geometry fuser 322 may "fuse" or combine the map data, from the mapper 304, with the geometry data (e.g., wait elements), from the wait geometry perceiver 302 via a process referred to as wait geometry fusion. Wait geometry fusion may optionally be performed to obtain improved geometry information from a combination of live perception (e.g., real-time geometry perception as performed by the wait geometry perceiver 302) and the map information (as received and/or provided by the mapper 304). For example, the wait geometry perceiver 302 may detect the presence of an intersection by live (e.g., real-time) perception. A map may also have the intersection annotated in the map data. In some embodiments, the map and geometry data may be fused to instantiate an intersection if it is present in any one of the sources, and to link the detections if they are present from both sources. Similarly, entry lines can be detected in real-time (via the wait geometry perceiver 302), and/or be provided in a map (via the mapper 304) based at least on previous map streams containing live detections or statistics of actual stopping points. Contender areas, inside ground, path geometry and contention points are all entities that can be detected live and also injected into the map stream to the benefit of future drives. The actual driving paths (the 'de-facto lane graph') can also be mined from multiple drives. Therefore, wait geometry fusion may reconcile and associate multiple sources to provide clear wait geometry for further stages of processing.

The signal fuser 328 may "fuse" or combine the map data, from the mapper 304, with the signal data from the signal perceiver 306 via a process referred to as signal fusion. Signal fusion may provide an option to reconcile information from live perception (via the real-time perception of the signal perceiver 306) with information from a map (received and/or provided by the mapper 304), such as for example assisting live perception with a corroboration of the presence of a traffic light, sign, or intersection type. Similar to geometry fusion, signal fusion may be optional in some embodiments. Such signal fusion provides the possibility to perform state estimation on a traffic light that is difficult to detect, and/or also the results from real-time signal perception.

The signal state estimator 330 is generally responsible for a process referred to as signal state estimation. Signal state estimation may determine and/or provide the states of traffic lights, the gestures of a policeman directing traffic, the 'stop' or 'slow' sign of a flagger, the state of road lights at a pedestrian crossing, or the position of a bar blocking traffic. The result is typically a choice from an enumeration class (such as green/yellow/red) or several in combination.

The geometry classifier 324 is generally responsible for a geometry classification process. Geometry classification categorizes wait geometries into discrete classes. For example, the geometry classifier 324 may categorize both an ego path (e.g., as encoded in the ego wait geometry 312) and a contender path (e.g., as encoded in the contender wait geometry 314) into classifications, such as but not limited to: "left turn," "straight," "right turn," "U-turn," and the like. This classification may be performed to standardize the path such that common language rules like "right turn on red is not allowed in Manhattan" may be applied to the path in the contention state resolution process performed by the contention state resolver 340. In order to apply such a rule, the path may be classified into a classification that includes common language (e.g., "right turn"). Note that such classification can benefit from the context of other paths (such as a relatively straight shape might be a right turn if it is the rightmost path, while if there is a very sharp right turn in addition, it might not). Geometry classification may also determine for a wait element if the ego or contender comes from the right.

Geometry classification may also be applied to pairs of paths. For example, the geometry classifier 324 may determine if two paths (e.g., an ego path and a contender path) are crossing or merging (if not explicitly given in the lane graph), where the contention points are, and which paths are coming from the right (to support right hand priority rules commonly applied in Europe and in some cases in the US). This may be performed by checking at the contention point if the direction vectors of the two paths are clearly distinct from parallel, and if so, the sign of the 2D vector cross product between them (the sign of the determinant applied to the 2×2 matrix formed by the ego path direction vector stacked as the top row and the contender path direction vector as the bottom row). If the sign is positive, the contender is coming from the right. Note that this definition may imply that for an ego left turn through oncoming traffic, the oncoming traffic is deemed to come from the right (since that is the case at the contention point). If the direction vectors are nearly parallel at the contention point (typically because it is a merge), the vectors at the corresponding entry lines may be used).

The geometry classifier 324 may also determine, or consolidate from live perception sources (e.g., the wait geometry perceiver 302), whether a contender path is from a "stub road" (e.g., a driveway, a gas station, or a parking lot), or is 'clearly larger' or 'clearly smaller' than a "stub road." That is, a road may be classified by the geometry classification process (e.g., as a "stub road"). The geometry classifier 324 may provide predicate-like classifications that allow logic rules to apply to a coherent collection of input variables. Some of this information may come directly from outputs of one or more neural networks or other machine learning models rather than be a geometric determination, via a wait geometry data structure.

The geometry classifier 324 may also determine if a path has a property, such as but not limited to: "crosses a line," which may be an explicit determination of whether the path crosses a line (e.g., a path may be classified as "crosses a line"). Such a classification may be employed as a cue for some rules when priority is unclear how to arbitrate. For example, if two paths are in contention and otherwise equivalent but one crosses a line and the other does not, the path that does not cross a line may have priority. A path having a left turn through oncoming traffic can have a classification of "crosses a dashed line," "crosses a solid line," or "crosses a solid double yellow line" type properties so that country-specific rules can be applied to determine if this is allowed or not. The geometry classifier 324 may also set a variable, such as but not limited to, "intersection" to true or false for a wait group (and thereby for each wait element). This can also be used to cue some rules (such as for example to distinguish between how a pedestrian crossing is handled if it is adjacent to an intersection and if it is not).

The geometry associator 326 may associate signals with paths through a process referred to as geometry association. Geometry association determines which signals apply to a path. This may answer questions such as 'is this light close enough to this path to apply to it?,' 'is this light the closest/most relevant of that type to this path?,' 'is this sign intended to apply to this path?.' For light-to-path association, it may not be easily separable from the rules, since it can for example be hard to know if a light applies to a left turn and then it lights up with a green arrow resolving the ambiguity. Note also that this analysis may often benefit from all signals and paths being considered in concert. For example, a light offset to the right may apply to an ego path in one case where there is no other path, but not apply in another where there is a path further to the right. Similarly, a light off to the right may apply to an ego path in one case where there is no other light, but not apply in another where there is a light exactly above the path. Thus, geometry association may consider the entire scene as well as signal states as needed (or even original sensor data). For the same reason, the architecture may allow geometry classification performed by the geometry classifier 324 and geometry association performed by the geometry associator 326 to run jointly and to have access to wait geometry, signals and even original sensor data. In that sense, the process may assign links between signals like traffic lights and signs and paths. In at least one embodiment, geometry association may first check if a light or sign is even at a distance that allows for a link to a path, and then if it does find the closest (in some sense) light or sign of each type that applies, determine a priority order (such as a left turn light has the highest priority for a left turn, but the closest regular light also applies although it has second priority). Note that the association could change instantaneously if a light changes state and resolves some form of ambiguity.

The outputs of the wait geometry fuser 322, the mapper 304, the signal state estimator 330, the geometry classifier

324, the geometry associator 326, and the other sensor data receiver 308 may be fed (as inputs) into the contention state resolver 340. The contention state resolver 340 may perform a process referred to as a contention state resolution process. The goal of the contention state resolution process may be to provide a contention state (e.g., the state of contention 318) for the wait element 310 (and/or other wait elements). The state of contention 318 of the wait element 310 may be an instruction to the yield planner about in which manner the ego-vehicle should yield or take way with respect to this wait element, as a matter of rule, expectation, formal or informal convention or norm. In some non-limiting embodiments, the state of contention 318 may not indicate what is actually happening in the yield scenario, what is physically possible in the yield scenario, or whether the ego-vehicle may be forced to yield although it has the right of way in the yield scenario (e.g., a crossing yield scenario or a merging yield scenario). Rather, the state of contention 318 may indicate what should happen according to convention. It may be the yield planner's responsibility to actually implement yielding, in the sense that it will consider what should happen (e.g., as encoded in the state of contention 318), whether the ego-vehicle is actually in a position to stop and follow that instruction, and whether the other actors (e.g., the contenders of the yield scenario) appear to be fulfilling their expected yielding duties, and take appropriate action. In other words, the yield planner can determine that even though the contention state is Take Way, a contender is not yielding (essentially detecting 'appropriate-to-honk') and decide to yield although that is not what should have happened. The yield planner may implement yielding behavior that analyzes all contentions in a wait group until all the wait elements in the group can be cleared jointly. All contentions in the wait group may be jointly complied with, meaning the most restrictive contention may define the ego-vehicle's expected yielding behavior. For example, if one contention state of the wait group is Take Way and another Stop at Entry, the ego-vehicle may remain at the entry line. State of contention 318 may be similar to the state of contention 210 of FIG. 2. Various possible state-values for the state of contention 318 are discussed in conjunction with the state of contention 210.

The contention state resolution process of the contention state resolver 340 may be based at least on base "rules of the road" (or "base rules") that may vary from country-to-country, state-to-state, region-to-region, and the like. The base rules may be basic logic rules that apply to the wait geometries (e.g., the ego wait geometry 312 and the contender wait geometry 314) and signals after they have been reduced to the state of basic enumeration variables by a geometry classification process (e.g., via the geometry classifier 324) and the geometry association process (e.g., via the geometry associator 326). After those reductions, each wait element may have a well-defined set of geometry classes and signal states that apply to the wait geometry. In addition to base rules, the contention state resolution process may employ "map rules." A map rule may include a wait element (e.g., the wait element 310) and an array of pairs of propositions linked to states of contention.

Each proposition may be conditioned on any number of signal states (not conditioning on any signal state is also allowed). The state of contention and/or its proposition may be paired up with the state of contention indicated if the proposition evaluates to true. The semantics of the map rule may be that each of the propositions are evaluated in order and the first one that evaluates to true defines the state of contention. The state already included in the wait element may considered a default contention state that is selected if none of the propositions evaluate to true. The condition checker 342 of the contention state resolver 340 may be generally responsible for performing such evaluations, and linking propositions.

In at least one embodiment, the condition checker 342 may generally determine which signals are valid or invalid (or active or inactive) based at least on one or more perceived and/or determined conditions of the environment. For example, some signs may or may not apply depending on the weather conditions (e.g., rain, snow, fog, wind), time of day, day of the week, the presence of other signs (e.g., roadwork signs may supersede other signs), the vehicle type of the autonomous vehicle (e.g., car vs. truck), etc. For example, if there is a map rule that has a condition that only applies from time X to time Y, the condition checker 342 may be used to determine and mark whether the map rule currently applies.

A map rule matcher 346 is generally responsible for performing a map rule matching process. The map rule matching process may take the map rules and match their components (or data components) to the items that are determined to actually be present and produce wait elements in the process. For example, the map rule matcher 346 may take signals and other inputs that are determined to apply by the condition checker 342, and resolve them to one or more map rules. For example, the map rule matcher 346 may determine one or more map rules apply based on an associated traffic light signal being green, whereas the map rule matcher 346 may not determine the map rule(s) applies if the traffic light signals is red (but may determine a different rule applies). These determinations may be based at least on the map rule matcher 346 knowing the condition(s) actually applies (e.g., traffic light state) according to the determinations by the condition checker 342.

To increase the ability to benefit from mutual exclusion constraints and in general to make a holistic decision, the map rule matching process performed by the map rule matcher 346 may start by a process that establishes a correspondence between paths, wait geometry and signals in the map and the paths, and wait geometry and signals that are determined to actually be present by the condition checker 342. Note that in some cases, these entities may come from a map in the first place (such as for example, the wait element engine 300 may be configured such that the lane graph is received from a map, and considers a map rule with one of the same paths and whether it matches), so it may perform the matching 'by ids' that have already been established during lane graph fusion, wait geometry fusion or signal fusion. However, to increase the flexibility and generality, the map rule matcher 346 may perform the matching without using information from a map. For example, the map rule matcher 346 may employ a lane graph from live perception (e.g., via the wait geometry perceiver 302) and apply a map rule from the map associating a traffic light to the ego path, and avoid architectural complications arising from having to propagate map identifier numbers all the way through lane graph, wait geometry and signals. If a path, piece of wait geometry, or signal is actually derived from a map, its geometry should be identical (or nearly identical if it was successfully fused/blended), so matches should be recovered correctly. The matching may also match entities that are not exactly identical. For example, roughly similar left turn shapes and placements may be expected to match (note here again that if there are two parallel left turns present, the matching benefits from considering them jointly). Thus, this process may essentially perform a matching that corresponds the 'map scene' with the 'actual scene' that has been determined by any combination of live perception and map localization. The result may be a 1-to-1 correspondence between a subset of the actual entities to a subset of the map entities.

In various embodiments, each map rule may result in an output wait element (e.g., the wait element 310 or a precursor thereto) by matching all its entities and resolving all its signals. Many map rules may contain a valid ego path (since many contention states are implemented conditionally on it and do not make sense without it). If that ego path is not finding a match, it could be for a few reasons. If localization fails in a known way, then map rules may not be used and the failure to localize may be handled in a different way. However, if localization is inaccurate it could cause the ego path to not match. Another possibility is that the ego path is inaccurate either in the map or in the actual scene. Another possibility is that the path is too far away or occluded from live perception. In this case, a conservative approach may force the ego path into the scene. For this reason, ego paths from map rules that have not found a match may be added, together with their wait geometry. The same process may be applied to contender paths. In fact, the entire set of wait elements from the map rules could be considered separately, except for the signals, although the correspondence may be important when considering the fusion of map rules with base rules performed by the wait element fuser 348. The signals on the other hand may have to be matched in order to resolve their state. Any state of a signal that is not matched may be set to the state Unknown, and the proposition in the map rules may account for this possibility and assign the appropriate state of contention. This can commonly entail, for example, setting the contention state to Stop at Entry when the state of a single traffic light is unknown. This can also entail using one out of several synchronized traffic lights to resolve the same wait element, defaulting to Stop at Entry only if all of them are unknown. In yet other cases, this could entail falling back to Yield Contention Point for a left turn through oncoming traffic when the green turn arrow traffic light is not visible but a green circle is visible and it is known that the turn is always allowed in that case (although it is unknown whether it is protected or not). This example is aggressive, but the design provides high flexibility without high complexity (another less flexible option would be to list possible states and enumerate all possible combinations and find the most constraining contention state across all possibilities).

The base rule parser 344 is generally responsible for performing a base rule parsing process that may take the proposition rules derived in two ways. First, proposition rules may be derived from the base rules via basic state variable estimation, geometry classification and geometry association. Second, the proposition rules may be derived from map rules. For example, the base rule parser 344 may take signals and other inputs that are determined to apply by the condition checker 342, and resolve them to one or more base rules. In at least one embodiment, the base rule parser 344 may operate similar to the map rule matcher 346, but applies general or universal rules and conditions on driving that are agnostic to historical or observed behavior of vehicles at the yield scenario location.

While base rules may vary country-to-country, state-to-state, region-to-region, and the like, they may apply consistently yield scenario-to-yield scenario so long as corresponding conditions are satisfied. In contrast, map rules may apply rules and conditions on driving that are based at least on historical or observed behavior of vehicles at a yield scenario location or similar yield scenario locations. In at least one embodiment, map rules may be encoded into the map data and applied based at least on localizing the autonomous vehicle to a map. However, base rules may apply regardless of localization and yield scenario location. By providing the base rule parser 344, wait elements may be generated even where map data is unavailable or cannot be applied or localized to the current yield scenario. For example, wherein the map rule matcher 346 is unable to determine one or more components and/or elements of a wait element, the base rule parser 344 may fill-in any gaps or vice versa. Thus, wait elements may be generated completely from maps data, completely from perception data, or from a combination of both types of data.

The wait element fuser 348 is generally responsible for fusing or combing data corresponding to the parsed base rules and the matched map rules to resolve the state of contention 318. For example, in at least one embodiment, the base rule parser 344 and the map rule matcher 346 may each produce respective wait elements and/or elements and/or components thereof. The wait element fuser 348 may fuse any of these various aspects to form the wait element 310. In at least one embodiment, one or more of the aspects from the base rule parser 344 and the map rule matcher 346 may conflict. For example, the same field or data element may have different values. The wait element fuser 348 may identify and/or detect such conflicts to determine a resolved value(s) for the wait element 310. In at least one embodiment, determinations of the map rule matcher 346 may generally take precedence, as they are based on locality and perception data may not always be reliable. This may be useful, for example, where the base rule parser 344 is unable to derive a relevant rule that should be applied. For example, if there is no sign or other visual indicator that there is no turn on left at an intersection, the base rule parser 344 may be unable to apply a corresponding base rule even where that rule is followed by convention. However, the map rule matcher 346 may apply the rule based at least on observing that the rule applies from historical drives of autonomous vehicles through the intersection. However, it is possible there are temporary or new signals that may not be present or have a high enough level of confidence (e.g., based on inconsistent or too few observations, stale observations, etc.) to include in the map data. The base rule parser 344 may be used to account for such scenarios (e.g., for construction signs, electronic signs, or other temporary or transient signals, corresponding determinations by the base rule parser 344 may take precedence based at least on being assigned to or associated with these types of signals) when resolving data to the wait element 310.

Although not shown in FIG. 3, a wait element engine may optionally include an obstacle in path analyzer that performs an obstacle in path analysis (OIPA). An OIPA may link actors to paths and wait geometry using lane graph, wait geometry and Semantic Motion Segmentation (SMS) obstacle perception output. OIPA may be performed by rendering the paths and areas into an index image, and then projecting the polygonal shapes of actors into the image and integrating the amount of overlap.

Additionally, the wait element engine may include an occlusion analyzer. Occlusion analysis may provide occlusion understanding to the OIPA results by taking a lane graph and obstacle perception outputs such as SMS and a depth map and detecting segments in the lane graph that could hide an unseen actor. This may allow the yield planner to consider unseen actors as well as visible ones. A contender path may come with an expected velocity limit, and occluded parts of that path can then be used to insert an unseen actor with that maximum velocity at the closest occluded placement it can currently be in, with appropriate caveats for expected conventions (for example, if the state of contention is Stopped First has Precedence, an unseen vehicle far behind its contention area and entry line should not reasonably be expected to be coming in at maximum speed if that does not allow it to stop at its entry line, while if it is Yield Contention Point it may be assumed that it could be coming in at maximum speed). With this information, the yield planner can then consider unseen vehicles and correctly generate behavior such as slowing down, waiting or slowly rolling forward until it can uncover occluded areas or until the traffic light goes green in the right turn on red case.

The wait element engine 300 may additionally perform a Who-Stopped-First analysis. The Who-Stopped-First analysis may determine which actor stopped first to support the contention state Stopped First has Precedence using motion analysis and OIPA results. The OIPA results may be used to determine if an actor has entered inside ground, is at their entry contender area, and at the entry line. Motion may also be used to determine whether the actor is in motion, stopped but recently moved, or whether possibly a parked vehicle. Another analysis of the wait element engine 300 may include a Who-Goes-First analysis. A Who-Goes-First analysis may be a machine learned analysis that estimates a contention state corresponding to each contender. Such an analysis may be trained by many examples of future progressions where it can be determined whether an actor went ahead past the contention point before the ego-vehicle, or vice versa. Knowing the likelihood of who-goes-first may be an indication to yielding expectations.

As noted throughout, the wait element 310 output of the wait element engine 300 may be passed to a yield planner of the ego-vehicle. The yield planner may implement yielding behavior for the ego-vehicle, given the wait elements with resolved contention state, the OIPA results with occlusion, the who-stopped-first, who-goes-first, and obstacle perception outputs. The yield planner may cause a yielding behavior in the ego-vehicle, if required and possible and monitors the yielding of the other actors when taking way. The yield planner analysis may be performed to predict ahead what would happen if the ego-vehicle proceeds on the claimed path. If the ego-vehicle goes forward and is supposed to yield, the ego-vehicle may clear the contention before contenders who have right of way are affected (e.g., forced to alter their behavior). Yielding may include insuring that the ego-vehicle is not influencing the contenders to alter their behavior from their preferred or intended behavior.

Figure 5:
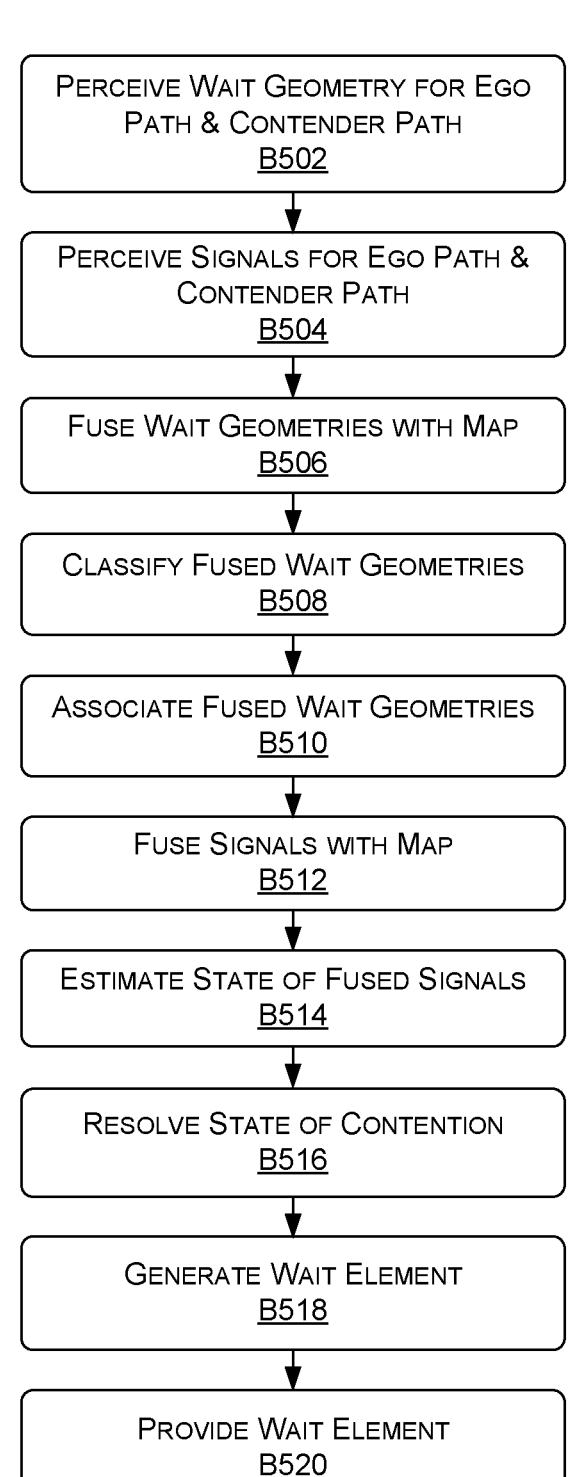
FIG. 5 is a flow diagram showing a method for encoding yield scenarios for autonomous vehicles (e.g., an ego vehicle), in accordance with some embodiments of the present disclosure.
Figure 6:
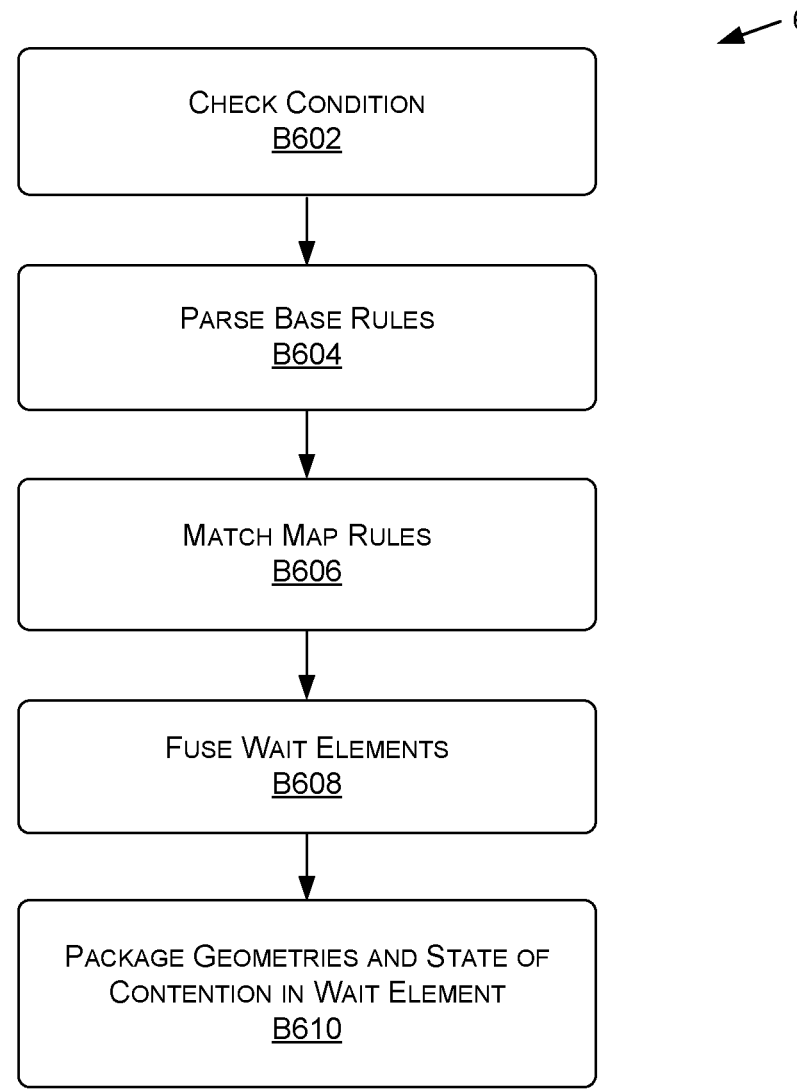
FIG. 6 is a flow diagram showing a method 600 for resolving a state of contention between paths for vehicles, in accordance with some embodiments of the present disclosure.

Now referring to FIGS. 4-6, each block of methods 400-600, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 400-600 are described, by way of example, with respect to the wait element engine 300 of FIG. 3. However, these methods may additionally or alternatively be executed by any one system, or any combination of systems, including, but not limited to, those described herein.

FIG. 4 is a flow diagram showing a method 400 for encoding yield scenarios for autonomous vehicles (e.g., an ego vehicle), in accordance with some embodiments of the present disclosure. The method may be carried out via a wait element engine, such as but not limited to the wait element engine 300 of FIG. 3. The method 400, at block B402, includes detecting and/or identifying an upcoming yield scenario. The yield scenario may correspond to a crossing (or intersection) yield scenario or a merging yield scenario. The yield scenario may be associated with an autonomous vehicle (e.g., an ego-vehicle) and one or more contenders.

At block B404, geometry data may be received. In some embodiments, the geometry data may be received in response to detecting the yield scenario. The geometry data may include geometry perception data. For example, the wait geometry perceiver 302 of the wait element engine 300 may receive real-time geometry data generated from one or more sensors of the autonomous vehicle.

At block B406, signal data may be received. In some embodiments, the signal data may be received in response to detecting the yield scenario. The signal data may include signal perception data. For example, the signal perceiver 306 of the wait element engine 300 may receive real-time signal data generated from the one or more sensors of the autonomous vehicle.

At block B408, map data may be received. In some embodiments, the map data may be received in response to detecting the yield scenario. For example, the mapper 304 of the wait element engine 300 may receive map data.

At block B410, lane graph data may be received. In some embodiments, the lane graph data may be received in response to detecting the yield scenario. The lane graph data may include one or more ego paths and one or more contender paths for one or more contenders of a yield scenario. For example, the lane grapher 350 of the wait element engine 300 may receive the ego paths 352 for an ego vehicle (e.g., the autonomous vehicle) and the contender paths 354 for the one or contenders associated with the yield scenario.

At block B412, a geometry for an ego path of the one or more ego paths may be determined. The geometry for the ego path may be determined via the geometry data, the map data, the signal data, and/or the lane graph data. As such, the wait geometry perceiver 302, the mapper 304, the signal perceiver 306, the lane grapher 350, or any combination thereof may be generally responsible for determining the geometry of the ego path. In some embodiments, the wait geometry fuser 322 of the wait element engine 300, the geometry classifier 324 of the wait element engine 300, the geometry associator 326 of the wait element engine 300, the signal fuser 328 of the wait element engine 300, the signal state estimator 330 of the wait element engine 300, or any combination thereof may contribute to the determination of the geometry for the ego path.

Also at block B412, a geometry for a contender path of the one or more contender paths of the one or more contenders may be determined. Similar to the ego path, the geometry for the contender path may be determined via the geometry data, the map data, the signal data, and/or the lane graph data. As such, the wait geometry perceiver 302, the mapper 304, the signal perceiver 306, the lane grapher 350, or any combination thereof may be generally responsible for determining the geometry of the contender path. In some embodiments, the wait geometry fuser 322 of the wait element engine 300, the geometry classifier 324 of the wait element engine 300, the geometry associator 326 of the wait element engine 300, the signal fuser 328 of the wait element engine 300, the signal state estimator 330 of the wait element engine 300, or any combination thereof may contribute to the determination of the geometry for the contender path. In some embodiments, at block 414, a geometry for a context of the paths and/or yield scenario is determined.

At block B414, the geometries for the ego path and the contender path may be encoded. The geometry of the ego path may be encoded in an ego wait geometry (e.g., the ego wait geometry 312 of FIG. 3). The geometry of the contender path may be encoded in a contender wait geometry (e.g., the contender wait geometry 314 of FIG. 3). In at least one embodiment, the geometry for the context of the paths and/or yield geometry is encoded in context wait geometry e.g., context wait geometry 316 of FIG. 3).

At block B416, a state of contention between the ego path and the contender path may be determined based at least on the determined geometries. Various embodiments for determining a state of contention are discussed in conjunction with at least the wait element engine 300, the method 500 of FIG. 5, and/or the method 600 of FIG. 6. However, briefly here, the contention state resolver 340 of the wait element engine 300 may be generally responsible for determining and/or resolving a state of contention for the ego path and the contender path. The state of contention may be encoded (e.g., the state of contention 318 of FIG. 3).

At block B418, a wait element data structure (or data object) may be generated, e.g., the wait element 310 of FIG. 3. The wait element data structure may include at least one of the geometry for the ego path, the geometry for the contender path, and the state of contention. The wait element may also include a context wait geometry.

At B420, the wait element may be provided to a yield planner for the autonomous vehicle.

FIG. 5 is a flow diagram showing a method 500 for encoding yield scenarios for autonomous vehicles (e.g., an ego vehicle), in accordance with some embodiments of the present disclosure. The method may be carried out via a wait element engine, such as but not limited to the wait element engine 300 of FIG. 3. The method 500, at block B502, includes perceiving a wait geometry for an ego path and a contender path. A geometry perceiver (e.g., the geometry perceiver 302 of the wait element engine 300) may perceive the wait geometries. The wait geometries may be perceived in response to detecting and/or identifying a yield scenario for an ego vehicle (an autonomous vehicle). The ego path and the contender path may be perceived by a lane grapher (e.g., a lane grapher 350 of the wait element engine 300).

At block B504, one or more signals may be perceived for the ego/contender paths. A signal perceiver (e.g., the signal perceiver 306) may perceive the signals for the paths.

At block B506, the wait geometries may be fused with map data. A wait geometry fuser (e.g., the wait geometry fuser 322 of the wait element engine 300) may fuse the wait geometries with the map data.

At block B508, the fused wait geometries may be classified. A geometry classifier (e.g., the geometry classifier 324 of the wait element engine 300) may classify the wait geometries.

At block B510, the fused wait geometries may be associated. A geometry associator (e.g., the geometry associator 326 of the wait element engine 300) may associate the wait geometries.

At block B512, the signals may be fused with map data. A signal fuser (e.g., the signal fuser 328 of the wait element engine 300) may fuse the signals with the map data.

At block B514, states of the fused signals may be estimated. A signal state estimator (e.g., the signal state estimator 330 of the wait element engine 300) may estimate the state of the fused signals.

At block B516, a state of contention between the ego path and the contender path may be resolved. Various embodiments of resolving a state of contention are discussed at least in conjunction with the method 600 of FIG. 6. However, briefly here, a contention state resolver (e.g., the contention state resolver 340 of the wait element engine 300) may resolve the state of contention between the ego path and the contender path.

At block B518, a wait element may be generated. For example, the wait element engine 300 may generate the wait element 310.

At block B520, the wait element may be provided to a system (e.g., a yield planner) that provides guidance services to an autonomous vehicle (e.g., the ego-vehicle).

FIG. 6 is a flow diagram showing a method 600 for resolving a state of contention between paths for vehicles, in accordance with some embodiments of the present disclosure. The method may be carried out via a contention state resolver, such as but not limited to the contention state resolver 340 of FIG. 3. Various inputs may be provided to the contention state resolver to resolve the state of contention between the two paths (e.g., an ego path and a contender path). For example, as shown in FIG. 3, map data, as well as fused, classified, and/or associated geometries (e.g., wait geometries) for the two paths may be provided to the contention state resolver 340. Furthermore, fused signals (included estimated signal states) may be provided to the contention state resolver. Various other sensor data (from sensors on the autonomous vehicle) may be provided to the contention state resolver. The various blocks of the method 600 may employ any of this inputted data.

The method 600, at block B602, includes checking a condition of the state of contention. A condition checker (e.g., the condition checker 342 of the contention state resolver 340) may be employed to check the condition of the state of contention.

At block B604, one or more base rules may be parsed. A base rule parser (e.g., the base rule parser 344 of the contention state resolver 340) may parse the base rules.

At block B606, one or more map rules may be matched to the state of contention. A map rule matcher (e.g., the map rule matcher 346 of the contention state resolver 340) may match the state of contention to one or more map rules.

At block B608, the various data structures (e.g., wait geometries and state of contention) may be fused into one wait element. A wait element fuser (e.g., the wait element fuser 348 of the contention state resolver 340) may fuse the data structures.

At block B610, the fused data structures (e.g., wait geometries and a resolved state of contention) may be packaged into a wait element (e.g., the wait element 310 of FIG. 3).

Example Autonomous Vehicle

Figure 7A:
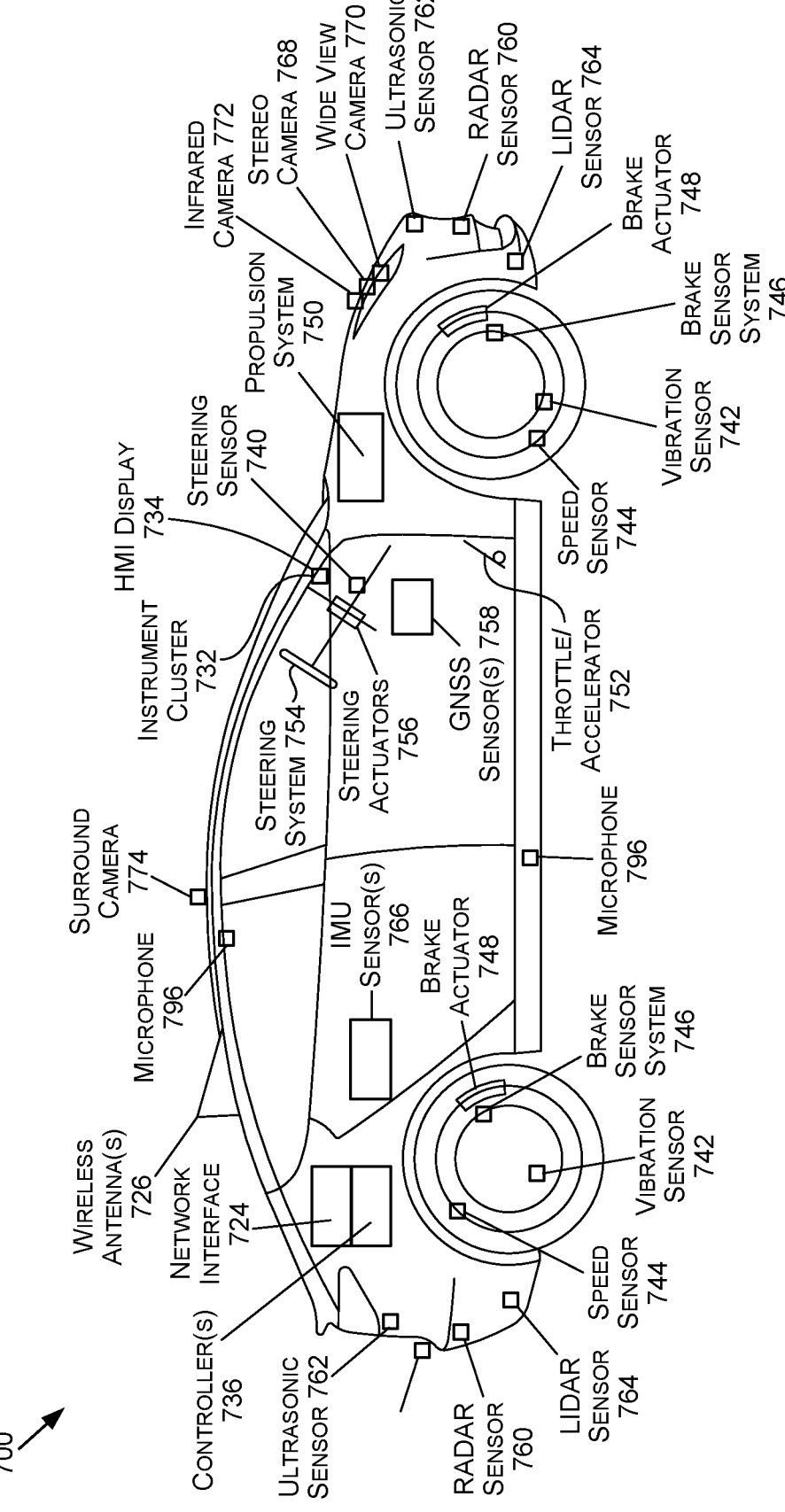
FIG. 7A is an illustration of an example autonomous vehicle, in accordance with some embodiments of the present disclosure.

FIG. 7A is an illustration of an example autonomous vehicle 700, in accordance with some embodiments of the present disclosure. The autonomous vehicle 700 (alternatively referred to herein as the "vehicle 700") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 700 may be capable of functionality in accordance with one or more of Level 3-Level 5 of the autonomous driving levels. The vehicle 700 may be capable of functionality in accordance with one or more of Level 1-Level 5 of the autonomous driving levels. For example, the vehicle 700 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 700 or other machine, such as being fully autonomous, being highly autonomous, being conditionally autonomous, being partially autonomous, providing assistive autonomy, being semi-autonomous, being primarily autonomous, or other designation.

The vehicle 700 may include components such as a chassis, a vehicle body, wheels (e.g., 2, 4, 6, 8, 18, etc.), tires, axles, and other components of a vehicle. The vehicle 700 may include a propulsion system 750, such as an internal combustion engine, hybrid electric power plant, an all-electric engine, and/or another propulsion system type. The propulsion system 750 may be connected to a drive train of the vehicle 700, which may include a transmission, to enable the propulsion of the vehicle 700. The propulsion system 750 may be controlled in response to receiving signals from the throttle/accelerator 752.

A steering system 754, which may include a steering wheel, may be used to steer the vehicle 700 (e.g., along a desired path or route) when the propulsion system 750 is operating (e.g., when the vehicle is in motion). The steering system 754 may receive signals from a steering actuator 756. The steering wheel may be optional for full automation (Level 5) functionality.

The brake sensor system 746 may be used to operate the vehicle brakes in response to receiving signals from the brake actuators 748 and/or brake sensors.

Controller(s) 736, which may include one or more system on chips (SoCs) 704 (FIG. 7C) and/or GPU(s), may provide signals (e.g., representative of commands) to one or more components and/or systems of the vehicle 700. For example, the controller(s) may send signals to operate the vehicle brakes via one or more brake actuators 748, to operate the steering system 754 via one or more steering actuators 756, to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to enable autonomous driving and/or to assist a human driver in driving the vehicle 700. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof.

The controller(s) 736 may provide the signals for controlling one or more components and/or systems of the vehicle 700 in response to sensor data received from one or more sensors (e.g., sensor inputs). The sensor data may be received from, for example and without limitation, global navigation satellite systems sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700), vibration sensor(s) 742, steering sensor(s) 740, brake sensor(s) (e.g., as part of the brake sensor system 746), and/or other sensor types.

One or more of the controller(s) 736 may receive inputs (e.g., represented by input data) from an instrument cluster 732 of the vehicle 700 and provide outputs (e.g., represented by output data, display data, etc.) via a human-machine interface (HMI) display 734, an audible annunciator, a loudspeaker, and/or via other components of the vehicle 700. The outputs may include information such as vehicle velocity, speed, time, map data (e.g., the HD map 722 of FIG. 7C), location data (e.g., the vehicle's 700 location, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 700 further includes a network interface 724 which may use one or more wireless antenna(s) 726 and/or modem(s) to communicate over one or more networks. For example, the network interface 724 may be capable of communication over LTE, WCDMA, UMTS, GSM, CDMA2000, etc. The wireless antenna(s) 726 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Figure 7B:
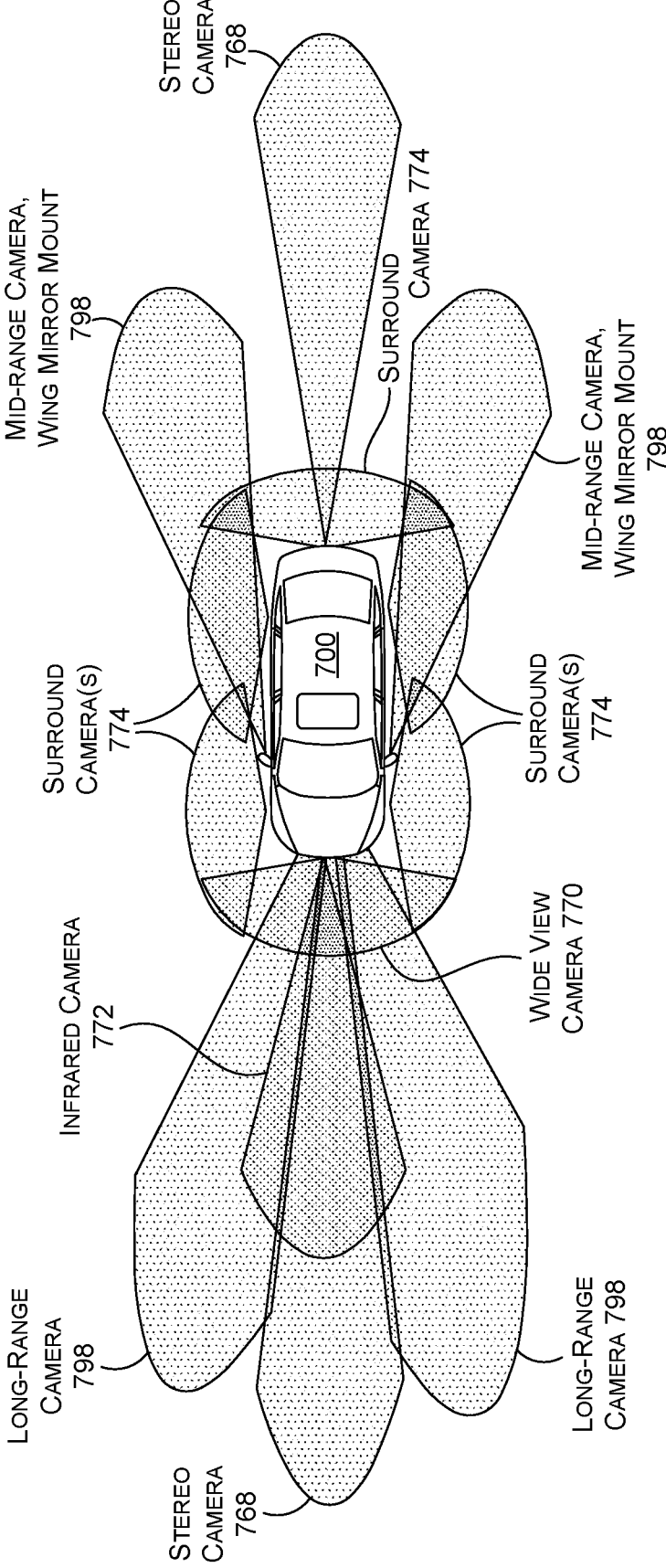
FIG. 7B is an example of camera locations and fields of view for the example autonomous vehicle of FIG. 7A, in accordance with some embodiments of the present disclosure.

FIG. 7B is an example of camera locations and fields of view for the example autonomous vehicle 700 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 700.

The camera types for the cameras may include, but are not limited to, digital cameras that may be adapted for use with the components and/or systems of the vehicle 700. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 700 (e.g., front-facing cameras) may be used for surround view, to help identify forward facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 770 that may be used to perceive objects coming into view from the periphery (e.g., pedestrians, crossing traffic or bicycles). Although only one wide-view camera is illustrated in FIG. 7B, there may any number of wide-view cameras 770 on the vehicle 700. In addition, long-range camera(s) 798 (e.g., a long-view stereo camera pair) may be used for depth-based object detection, especially for objects for which a neural network has not yet been trained. The long-range camera(s) 798 may also be used for object detection and classification, as well as basic object tracking.

One or more stereo cameras 768 may also be included in a front-facing configuration. The stereo camera(s) 768 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image.

An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that include portions of the environment to the side of the vehicle 700 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned to on the vehicle 700. The surround camera(s) 774 may include wide-view camera(s) 770, fisheye camera(s), 360 degree camera(s), and/or the like. Four example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround view camera.

Cameras with a field of view that include portions of the environment to the rear of the vehicle 700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 798, stereo camera(s) 768), infrared camera(s) 772, etc.), as described herein.

Figure 7C:
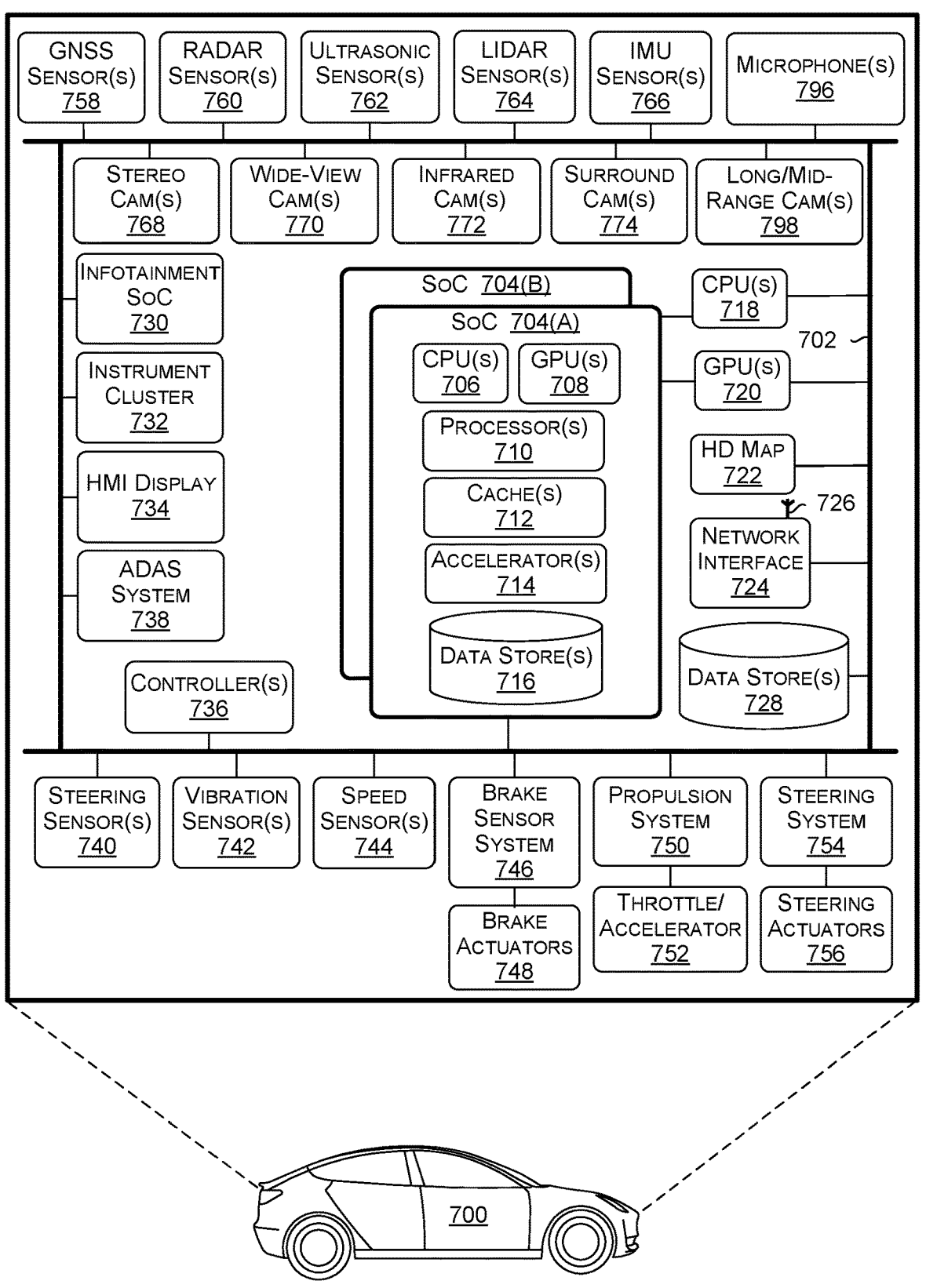
FIG. 7C is a block diagram of an example system architecture for the example autonomous vehicle of FIG. 7A, in accordance with some embodiments of the present disclosure.

FIG. 7C is a block diagram of an example system architecture for the example autonomous vehicle 700 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 700 in FIG. 7C are illustrated as being connected via bus 702. The bus 702 may include a Controller Area Network (CAN) data interface (alternatively referred to herein as a "CAN bus"). A CAN may be a network inside the vehicle 700 used to aid in control of various features and functionality of the vehicle 700, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 702 is described herein as being a CAN bus, this is not intended to be limiting. For example, in addition to, or alternatively from, the CAN bus, FlexRay and/or Ethernet may be used. Additionally, although a single line is used to represent the bus 702, this is not intended to be limiting. For example, there may be any number of busses 702, which may include one or more CAN busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 700, and two or more busses 702 may communicate with the same components. In some examples, each SoC 704, each controller 736, and/or each computer within the vehicle may have access to the same input data (e.g., inputs from sensors of the vehicle 700), and may be connected to a common bus, such the CAN bus.

The vehicle 700 may include one or more controller(s) 736, such as those described herein with respect to FIG. 7A. The controller(s) 736 may be used for a variety of functions. The controller(s) 736 may be coupled to any of the various other components and systems of the vehicle 700, and may be used for control of the vehicle 700, artificial intelligence of the vehicle 700, infotainment for the vehicle 700, and/or the like.

The vehicle 700 may include a system(s) on a chip (SoC) 704. The SoC 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 700 in a variety of platforms and systems. For example, the SoC(s) 704 may be combined in a system (e.g., the system of the vehicle 700) with an HD map 722 which may obtain map refreshes and/or updates via a network interface 724 from one or more servers (e.g., server(s) 778 of FIG. 7D).

The CPU(s) 706 may include a CPU cluster or CPU complex (alternatively referred to herein as a "CCPLEX"). The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation enabling any combination of the clusters of the CPU(s) 706 to be active at any given time.

The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 708 may include at least eight streaming microprocessors. The GPU(s) 708 may use compute application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s) 712 may include an L3 cache that is available to both the CPU(s) 706 and the GPU(s) 708 (e.g., that is connected both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include an arithmetic logic unit(s) (ALU(s)) which may be leveraged in performing processing with respect to any of the variety of tasks or operations of the vehicle 700—such as processing DNNs. In addition, the SoC(s) 704 may include a floating point unit(s) (FPU(s))— or other math coprocessor or numeric coprocessor types— for performing mathematical operations within the system. For example, the SoC(s) 104 may include one or more FPUs integrated as execution units within a CPU(s) 706 and/or GPU(s) 708.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 714 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 700 orientation, distance, 3D location estimates of the object obtained from the neural network and/or other sensors (e.g., LIDAR sensor(s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA. In some examples, the data store(s) 716 may be large enough in capacity to store multiple instances of neural networks for redundancy and safety. The data store(s) 712 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 700 into a chauffeur to safe stop mode (e.g., bring the vehicle 700 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high-dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and active doing 3D rendering, the video image compositor may be used to offload the GPU(s) 708 to improve performance and responsiveness.

The SoC(s) 704 may further include a mobile industry processor interface (MIPI) camera serial interface for receiving video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to enable communication with peripherals, audio codecs, power management, and/or other devices. The SoC(s) 704 may be used to process data from cameras (e.g., connected over Gigabit Multimedia Serial Link and Ethernet), sensors (e.g., LIDAR sensor(s) 764, RADAR sensor(s) 760, etc. that may be connected over Ethernet), data from bus 702 (e.g., speed of vehicle 700, steering wheel position, etc.), data from GNSS sensor(s) 758 (e.g., connected over Ethernet or CAN bus). The SoC(s) 704 may further include dedicated high-performance mass storage controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 700. The always on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detection and identification may use data from microphones 796 to detect and identify emergency vehicle sirens. In contrast to conventional systems, that use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 700 may include a GPU(s) 720 (e.g., discrete GPU(s), or dGPU(s)), that may be coupled to the SoC(s) 704 via a high-speed interconnect (e.g., NVIDIA's NVLINK). The GPU(s) 720 may provide additional artificial intelligence functionality, such as by executing redundant and/or different neural networks, and may be used to train and/or update neural networks based on input (e.g., sensor data) from sensors of the vehicle 700.

The vehicle 700 may further include the network interface 724 which may include one or more wireless antennas 726 (e.g., one or more wireless antennas for different communication protocols, such as a cellular antenna, a Bluetooth antenna, etc.). The network interface 724 may be used to enable wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 700 (e.g., vehicles in front of, on the side of, and/or behind the vehicle 700). This functionality may be part of a cooperative adaptive cruise control functionality of the vehicle 700.

The network interface 724 may include a SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 700 may further include data store(s) 728 which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 700 may further include GNSS sensor(s) 758. The GNSS sensor(s) 758 (e.g., GPS, assisted GPS sensors, differential GPS (DGPS) sensors, etc.), to assist in mapping, perception, occupancy grid generation, and/or path planning functions. Any number of GNSS sensor(s) 758 may be used, including, for example and without limitation, a GPS using a USB connector with an Ethernet to Serial (RS-232) bridge.

The vehicle 700 may further include RADAR sensor(s) 760. The RADAR sensor(s) 760 may be used by the vehicle 700 for long-range vehicle detection, even in darkness and/or severe weather conditions. RADAR functional safety levels may be ASIL B. The RADAR sensor(s) 760 may use the CAN and/or the bus 702 (e.g., to transmit data generated by the RADAR sensor(s) 760) for control and to access object tracking data, with access to Ethernet to access raw data in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 700 surroundings at higher speeds with minimal interference from traffic in adjacent lanes. The other two antennae may expand the field of view, making it possible to quickly detect vehicles entering or leaving the vehicle's 700 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 700 may further include ultrasonic sensor(s) 762. The ultrasonic sensor(s) 762, which may be positioned at the front, back, and/or the sides of the vehicle 700, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 700 may include LIDAR sensor(s) 764. The LIDAR sensor(s) 764 may be used for object and pedestrian detection, emergency braking, collision avoidance, and/or other functions. The LIDAR sensor(s) 764 may be functional safety level ASIL B. In some examples, the vehicle 700 may include multiple LIDAR sensors 764 (e.g., two, four, six, etc.) that may use Ethernet (e.g., to provide data to a Gigabit Ethernet switch).

In some examples, the LIDAR sensor(s) 764 may be capable of providing a list of objects and their distances for a 360-degree field of view. Commercially available LIDAR sensor(s) 764 may have an advertised range of approximately 700 m, with an accuracy of 2 cm-3 cm, and with support for a 700 Mbps Ethernet connection, for example. In some examples, one or more non-protruding LIDAR sensors 764 may be used. In such examples, the LIDAR sensor(s) 764 may be implemented as a small device that may be embedded into the front, rear, sides, and/or corners of the vehicle 700. The LIDAR sensor(s) 764, in such examples, may provide up to a 120-degree horizontal and 35-degree vertical field-of-view, with a 200 m range even for low-reflectivity objects. Front-mounted LIDAR sensor(s) 764 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 700. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 764 may be less susceptible to motion blur, vibration, and/or shock.

The vehicle may further include IMU sensor(s) 766. The IMU sensor(s) 766 may be located at a center of the rear axle of the vehicle 700, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may enable the vehicle 700 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 796 placed in and/or around the vehicle 700. The microphone(s) 796 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 798, and/or other camera types. The cameras may be used to capture image data around an entire periphery of the vehicle 700. The types of cameras used depends on the embodiments and requirements for the vehicle 700, and any combination of camera types may be used to provide the necessary coverage around the vehicle 700. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 700 may further include vibration sensor(s) 742. The vibration sensor(s) 742 may measure vibrations of components of the vehicle, such as the axle(s). For example, changes in vibrations may indicate a change in road surfaces. In another example, when two or more vibration sensors 742 are used, the differences between the vibrations may be used to determine friction or slippage of the road surface (e.g., when the difference in vibration is between a power-driven axle and a freely rotating axle).

The vehicle 700 may include an ADAS system 738. The ADAS system 738 may include a SoC, in some examples. The ADAS system 738 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LIDAR sensor(s) 764, and/or a camera(s). The ACC systems may include longitudinal ACC and/or lateral ACC. Longitudinal ACC monitors and controls the distance to the vehicle immediately ahead of the vehicle 700 and automatically adjust the vehicle speed to maintain a safe distance from vehicles ahead. Lateral ACC performs distance keeping, and advises the vehicle 700 to change lanes when necessary. Lateral ACC is related to other ADAS applications such as LCA and CWS.

CACC uses information from other vehicles that may be received via the network interface 724 and/or the wireless antenna(s) 726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 700), while the I2V communication concept provides information about traffic further ahead. CACC systems may include either or both I2V and V2V information sources. Given the information of the vehicles ahead of the vehicle 700, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 700 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 700 if the vehicle 700 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 700 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 700, the vehicle 700 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network which is trained and thus reduces the risk of false positives, as described herein.

The vehicle 700 may further include the infotainment SoC 730 (e.g., an in-vehicle infotainment system (IVI)). Although illustrated and described as a SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 700. For example, the infotainment SoC 730 may radios, disk players, navigation systems, video players, USB and Bluetooth connectivity, carputers, in-car entertainment, Wi-Fi, steering wheel audio controls, hands free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., CAN bus, Ethernet, etc.) with other devices, systems, and/or components of the vehicle 700. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 700) fail. In such an example, the infotainment SoC 730 may put the vehicle 700 into a chauffeur to safe stop mode, as described herein.

The vehicle 700 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. In other words, the instrument cluster 732 may be included as part of the infotainment SoC 730, or vice versa.

Figure 7D:
FIG. 7D is a system diagram for communication between cloud-based server(s) and the example autonomous vehicle of FIG. 7A, in accordance with some embodiments of the present disclosure.

FIG. 7D is a system diagram for communication between cloud-based server(s) and the example autonomous vehicle 700 of FIG. 7A, in accordance with some embodiments of the present disclosure. The system 776 may include server(s) 778, network(s) 790, and vehicles, including the vehicle 700. The server(s) 778 may include a plurality of GPUs 784(A)-784(H) (collectively referred to herein as GPUs 784), PCIe switches 782(A)-782(H) (collectively referred to herein as PCIe switches 782), and/or CPUs 780(A)-780(B) (collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 790 and from the vehicles, image data representative of images showing unexpected or changed road conditions, such as recently commenced road-work. The server(s) 778 may transmit, over the network(s) 790 and to the vehicles, neural networks 792, updated neural networks 792, and/or map information 794, including information regarding traffic and road conditions. The updates to the map information 794 may include updates for the HD map 722, such as information regarding construction sites, potholes, detours, flooding, and/or other obstructions. In some examples, the neural networks 792, the updated neural networks 792, and/or the map information 794 may have resulted from new training and/or experiences represented in data received from any number of vehicles in the environment, and/or based on training performed at a datacenter (e.g., using the server(s) 778 and/or other servers).

The server(s) 778 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning).

Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 790, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 700. For example, the deep-learning infrastructure may receive periodic updates from the vehicle 700, such as a sequence of images and/or objects that the vehicle 700 has located in that sequence of images (e.g., via computer vision and/or other machine learning object classification techniques). The deep-learning infrastructure may run its own neural network to identify the objects and compare them with the objects identified by the vehicle 700 and, if the results do not match and the infrastructure concludes that the AI in the vehicle 700 is malfunctioning, the server(s) 778 may transmit a signal to the vehicle 700 instructing a fail-safe computer of the vehicle 700 to assume control, notify the passengers, and complete a safe parking maneuver.

For inferencing, the server(s) 778 may include the GPU(s) 784 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 8:
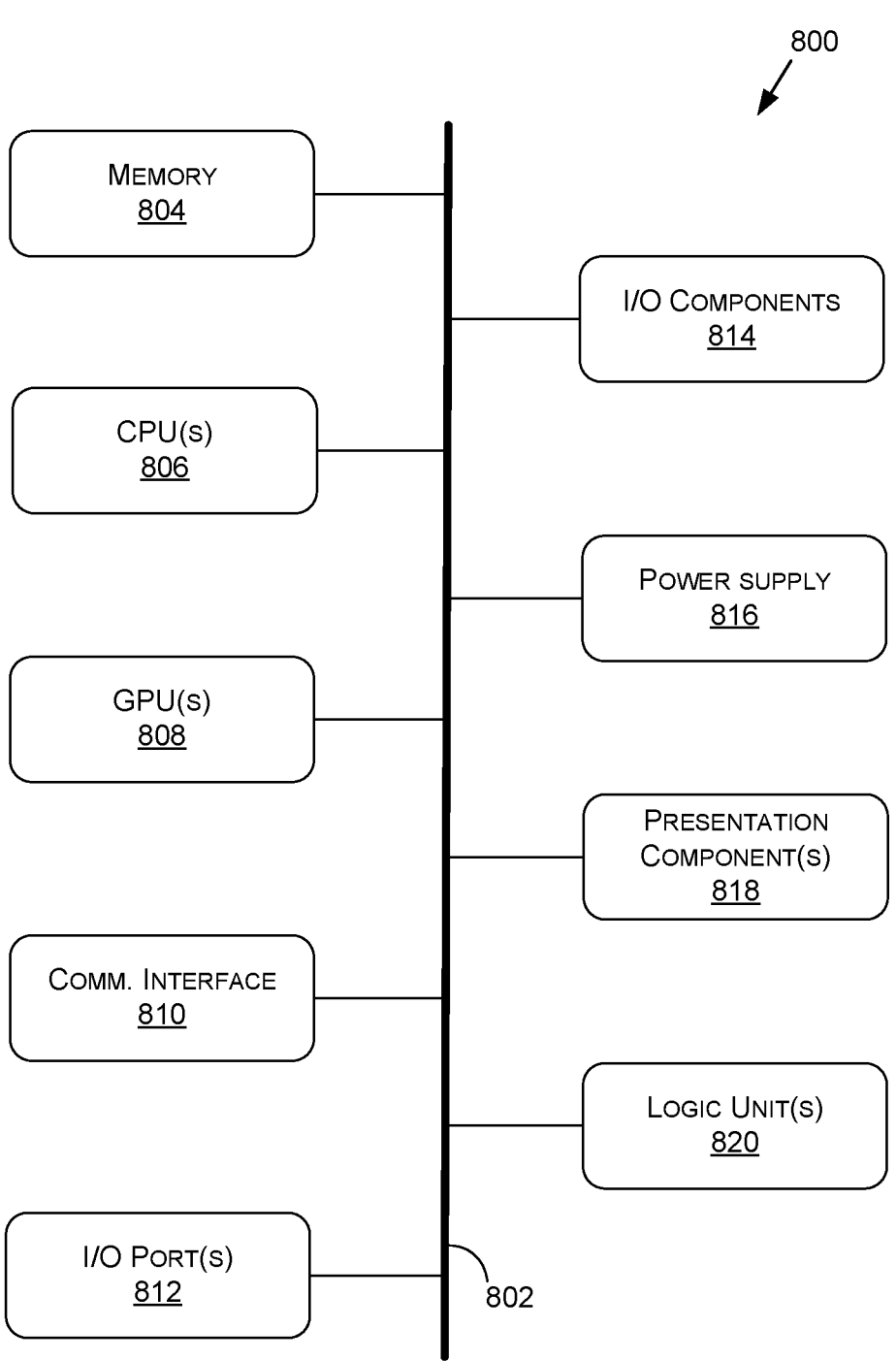
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Example Data Center

Figure 9:
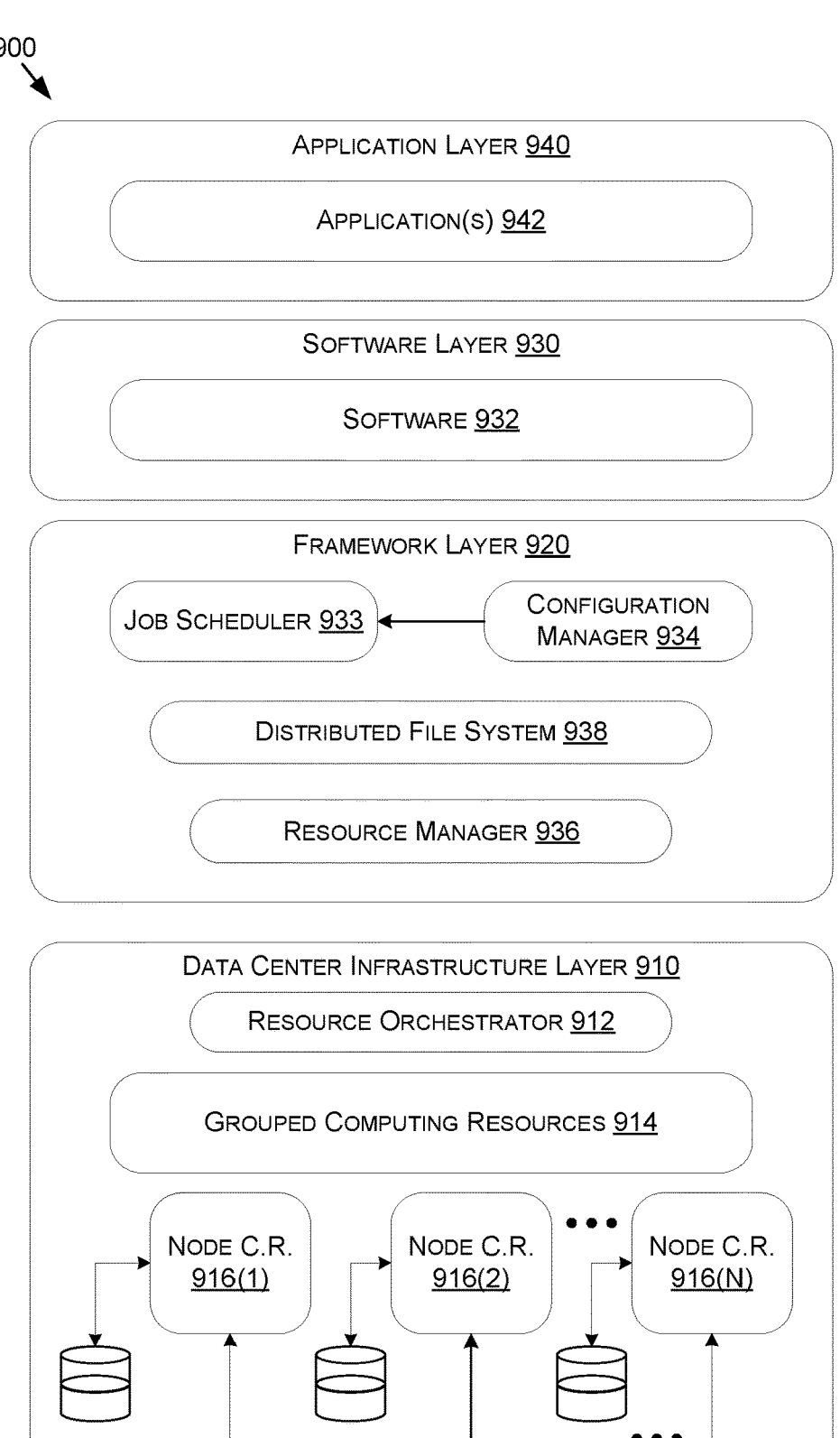
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 933, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 933 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 933. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

determining, based at least on perception data obtained using at least one sensor of a first vehicle in an environment, a first geometry representing a first path for the first vehicle in a scenario, a second geometry representing a second path for a second vehicle in the scenario, and at least one contention point corresponding to the first path and the second path;

matching, using the first geometry and the second geometry, the first path, the second path, and the at least one contention point to one or more traffic rules;

based at least on the matching, selecting, for the scenario, at least two categories from a plurality of categories of yield behavior, each category of yield behavior encoding a respective sequence of stages for the first vehicle to execute with respect to the second vehicle and the at least one contention point, each stage representing:

a respective yield maneuver executed during the stage, and one or more respective conditions that, when satisfied, enable the first vehicle to transition from the respective yield maneuver to a subsequent yield maneuver in a subsequent stage of the respective sequence; and based at least on the selecting, controlling the first vehicle through the scenario using the at least two selected categories, the controlling including, while executing the respective yield maneuver of a first category of the at least two categories, waiting to transition to the subsequent yield maneuver of the first category until a determination that:

the one or more respective conditions of the first category are satisfied, and the one or more respective conditions of a second category of the at least two categories are satisfied or capable of being satisfied.

2. The method of claim 1, wherein the at least one contention point includes an entry location and an exit location for the scenario with respect to the first path, a first condition of the one or more respective conditions corresponds to the entry location, a second condition of the one or more respective conditions corresponds to the exit location, and the controlling initiates using the at least two categories based at least on the entry location and terminates using the at least two categories based at least on the exit location.

3. The method of claim 1, wherein the one or more respective conditions of the first category correspond to a first location of the at least one contention point and the one or more respective conditions of the second category correspond to a second location of the at least one contention point.

4. The method of claim 1, wherein the matching includes:

evaluating, using the first geometry, the second geometry, and the at least one contention point, propositions corresponding to the first category of yield behavior; and determining, based at least on the evaluating, the propositions are true, wherein the selecting is based at least on the determining the propositions are true.

5. The method of claim 1, wherein the one or more traffic rules include at least one first traffic rule corresponding to the first category and at least one second traffic rule corresponding to a third category selected from the plurality of categories of yield behavior, and the method further includes:

detecting a conflict between the first category and the third category, wherein the matching selects the first category for the scenario over the third category based at least on determining, based at least on the conflict, that the first category has precedence over the third category of yield behavior.

6. The method of claim 1, wherein the one or more respective conditions of the first category includes a starting condition for the scenario, the starting condition corresponding to the first vehicle entering an intersection that represents the scenario, and the one or more respective conditions of the second category includes an ending condition for the scenario, the ending condition corresponding to the first vehicle exiting the intersection.

7. The method of claim 1, wherein the one or more traffic rules include:

at least one map rule corresponding to first yield behavior observed at a geographic location associated with the first vehicle and at least one base rule corresponding to second yield behavior corresponding to a geographic region associated with the first vehicle, and wherein the matching is based at least on resolving one or more conflicts between the at least one map rule and the at least one base rule.

8. At least one processor comprising:

one or more circuits to:

determine, based at least on sensor data obtained using at least one sensor of a first vehicle in an environment, a first geometry representing a first path for the first vehicle in a scenario, a second geometry representing a second path for a second vehicle in the scenario, and at least one contention point corresponding to the first path and the second path;

match, using the first geometry and the second geometry, the first path, the second path, and the at least one contention point to one or more traffic rules;

based at least on the matching, select, for the scenario, at least two categories from a plurality of categories of yield behavior, each category of yield behavior encoding a respective sequence of stages for the first vehicle to execute with respect to the second vehicle and the at least one contention point, each stage representing:

a respective yield maneuver executed during the stage, and one or more respective conditions that, when satisfied, enable the first vehicle to transition from the respective yield maneuver to a subsequent yield maneuver in a subsequent stage of the respective sequence; and based at least on the selection of the category of yield behavior, control the first vehicle through the scenario using the at least two selected categories, the controlling including, while executing the respective yield maneuver of a first category of the at least two categories, waiting to transition to the subsequent yield maneuver of the first category until a determination that:

the one or more respective conditions of the first category are satisfied, and the one or more respective conditions of a second category of the at least two categories are satisfied or capable of being satisfied.

9. The at least one processor of claim 8, wherein the one or more circuits are further to detect, using perception data obtained using at least one sensor of the first vehicle in the environment, a current state of one or more traffic signals included in one or more maps, wherein the one or more respective conditions for the first category are evaluated based at least on the current state of the one or more traffic signals.

10. The at least one processor of claim 8, wherein the one or more circuits are further to assign to the at least one contention point a classification of a crossing point where the first path and the second path intersect or a merging point where the first path and the second path meet and join for a segment, wherein the matching includes evaluating one or more matching conditions corresponding to the one or more traffic rules using the classification.

11. The at least one processor of claim 8, wherein the selecting of the at least two categories occurs at a first time prior to the vehicle initiating the scenario, and the at least two categories are used for the controlling until a second time when the vehicle completes the scenario.

12. The at least one processor of claim 8, wherein the one or more circuits are further to classify the first geometry corresponding to the first path as a first path type and the second geometry corresponding to the second path as a second path type, wherein the matching includes evaluating, based at least on the classifying, one or more matching conditions corresponding to the one or more traffic rules using the first path type and the second path type.

13. The at least one processor of claim 8, wherein prior to the matching each category of the plurality of categories of yield behavior is stored in a machine-readable representation that specifies the respective sequence of stages and the one or more respective conditions.

14. The at least one processor of claim 8, wherein the one or more traffic rules include one or more map rules associated with localizing the first vehicle to at least one map or one or more base rules associated with a geographic region of the first vehicle, the one or more base rules associated with the first category and the one or more map rules associated with a third category of yield behavior that conflicts with the first category.

15. A system comprising:

one or more processing units to:

determine, based at least on sensor data obtained using at least one sensor of a first vehicle in an environment, a first geometry representing a first path for the first vehicle in a scenario, a second geometry representing a second path for a second vehicle in the scenario, and at least one contention point corresponding to the first path and the second path;

match, using the first geometry and the second geometry, the first path, the second path, and the at least one contention point to one or more traffic rules;

based at least on the matching, selecting, for the scenario, at least two categories from a plurality of categories of yield behavior, each category of yield behavior encoding a respective sequence of stages for the first vehicle to execute with respect to the second vehicle and the at least one contention point, each stage representing:

a respective yield maneuver executed during the stage, and one or more respective conditions that, when satisfied, enable the first vehicle to transition from the respective yield maneuver to a subsequent yield maneuver in a subsequent stage of the respective sequence; and based at least on the selection of the category of yield behavior, control the first vehicle through the scenario using the at least two selected categories, the controlling including, while executing the respective yield maneuver of a first category of the at least two categories, waiting to transition to the subsequent yield maneuver of the first category until a determination that:

the one or more respective conditions of the first category are satisfied, and the one or more respective conditions of a second category of the at least two categories are satisfied or capable of being satisfied.

16. The system of claim 15, wherein the one or more respective conditions of the first category include a condition for the first vehicle to stop, await further instructions, and not proceed until a state of contention regarding the second vehicle has changed.

17. The system of claim 15, where the one or more processing units are further to:

receive perception data that includes first geometry information associated with at least the first path;

receive map data representative of second geometry information associated with at least the first path; and generate the first geometry based at least on fusing the first geometry information with the second geometry information.

18. The system of claim 15, where the one or more processing units are further to:

receive perception data that includes first signal information associated with one or more detected traffic signals in the environment;

receive map data including second signal information associated with one or more localized traffic signals from at least one map; and generate fused signal information associated with at least one traffic signal based at least on fusing the first signal information with the second signal information, wherein the matching is based at least on the fused signal information.

19. The system of claim 15, where the one or more processing units are further to classify the second path as belonging to at least one class, wherein the matching is based at least on the second path belonging to the at least one class.

20. The system of claim 15, where the one or more processing units are comprised in at least one of:

a control system for an autonomous or semi-autonomous machine;

a perception system for an autonomous or semi-autonomous machine;

a system for performing simulation operations;

a system for performing deep learning operations;

a system implemented using an edge device;

a system implemented using a robot;

a system incorporating one or more virtual machines (VMs);

a system implemented at least partially in a data center; or a system implemented at least partially using cloud computing resources.

\* \* \* \* \*